United States Patent
Moon et al.

(10) Patent No.: US 12,141,476 B2
(45) Date of Patent: Nov. 12, 2024

(54) METHOD OF WRITING DATA IN STORAGE DEVICE AND METHOD OF READING DATA FROM STORAGE DEVICE USING SENSOR INFORMATION, STORAGE DEVICE PERFORMING THE SAME AND METHOD OF OPERATING STORAGE DEVICE USING THE SAME

(71) Applicant: SAMSUNG ELECTRONICS CO., LTD., Suwon-si (KR)

(72) Inventors: Dongouk Moon, Seongnam-si (KR); Hyunjoon Yoo, Suwon-si (KR); Heeseok Eun, Hwaseong-si (KR); Kyoungeun Lee, Hwaseong-si (KR); Seunghan Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 160 days.

(21) Appl. No.: 17/815,352

(22) Filed: Jul. 27, 2022

(65) Prior Publication Data

US 2023/0195386 A1   Jun. 22, 2023

(30) Foreign Application Priority Data

Dec. 20, 2021   (KR) ........................ 10-2021-0182923

(51) Int. Cl.
*G06F 3/06* (2006.01)
(52) U.S. Cl.
CPC .......... *G06F 3/0659* (2013.01); *G06F 3/0604* (2013.01); *G06F 3/0665* (2013.01); *G06F 3/0673* (2013.01)

(58) Field of Classification Search
CPC .... G06F 3/0659; G06F 3/0604; G06F 3/0665; G06F 3/0673; G06F 3/061; G06F 3/064; G06F 3/0679; G06F 12/0246; G06F 3/0346; G06F 3/038; G06F 11/327; G06F 12/0292; G06F 2212/7201
See application file for complete search history.

(56) References Cited

U.S. PATENT DOCUMENTS

| | | |
|---|---|---|
| 7,660,071 B1 | 2/2010 | Riener et al. |
| 9,086,954 B2 | 7/2015 | Yeh |
| 9,342,443 B2 | 5/2016 | Walker et al. |
| 9,786,336 B2 | 10/2017 | Woo et al. |
| 9,959,936 B1 | 5/2018 | Song |

(Continued)

FOREIGN PATENT DOCUMENTS

CN        106372000 A   *   2/2017

*Primary Examiner* — Masud K Khan
(74) *Attorney, Agent, or Firm* — F. Chau & Associates, LLC

(57) ABSTRACT

In a method of writing data in a storage device, a data write request is received from a host device. Spatial information is received from a spatial sensor included in the storage device based on the data write request. A logical storage area management table is updated based on the data write request and the spatial information such that target data to be stored is written into a target storage area corresponding to the spatial information among a plurality of logical storage areas. A program command and the target data are transmitted to a nonvolatile memory such that the target data is programmed into a physical storage area in the nonvolatile memory corresponding to the target storage area.

19 Claims, 32 Drawing Sheets

(56) References Cited

U.S. PATENT DOCUMENTS

| | | |
|---|---|---|
| 2020/0301602 A1 | 9/2020 | Kurosawa |
| 2021/0026748 A1* | 1/2021 | Kim |
| 2021/0034289 A1* | 2/2021 | Dalmatov ............. G06F 3/0616 |
| 2022/0206587 A1* | 6/2022 | Da-Yuan ................. G06F 3/014 |

* cited by examiner

FIG. 12A

| SPATIAL INFORMATION A | LOGICAL STORAGE AREA A |
|---|---|
| SI_A_1 | LSA_A_1 |
| SI_A_2 | LSA_A_2 |
| ⋮ | ⋮ |
| SI_A_N | LSA_A_N |

314b1

| SPATIAL INFORMATION B | LOGICAL STORAGE AREA B |
|---|---|
| SI_B_1 | LSA_B_1 |
| SI_B_2 | LSA_B_2 |
| ⋮ | ⋮ |
| SI_B_M | LSA_B_M |

314b2

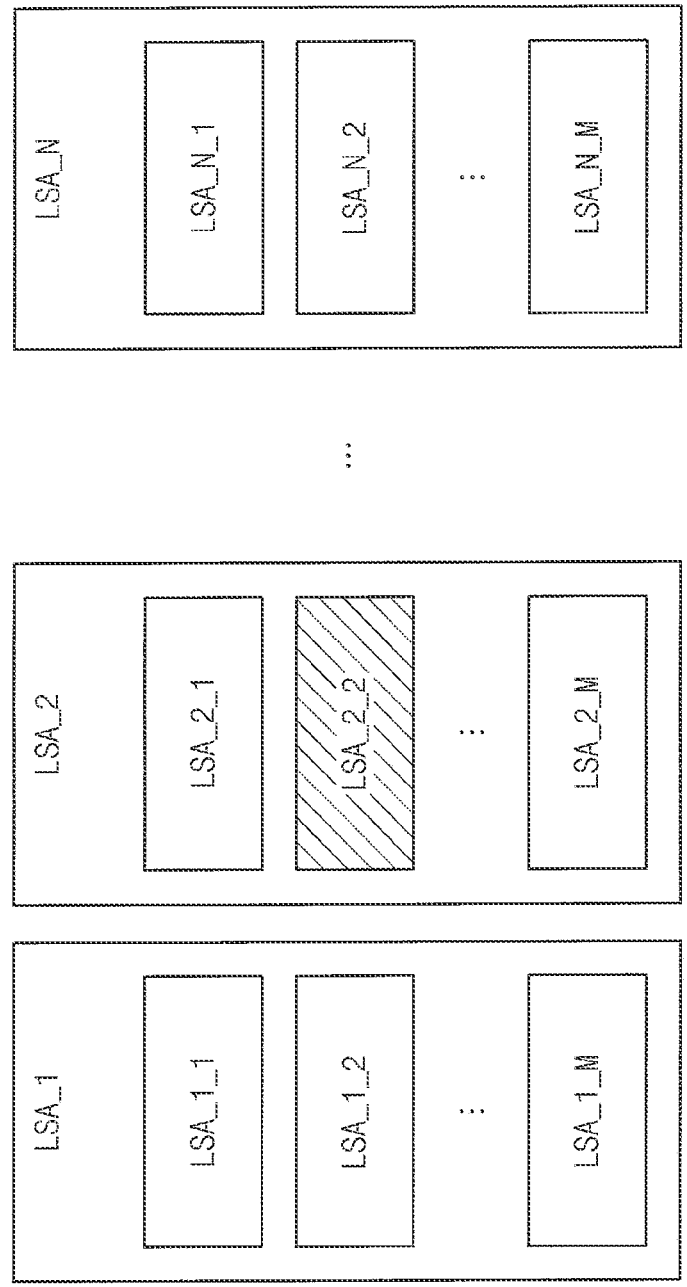

METHOD OF WRITING DATA IN STORAGE DEVICE AND METHOD OF READING DATA FROM STORAGE DEVICE USING SENSOR INFORMATION, STORAGE DEVICE PERFORMING THE SAME AND METHOD OF OPERATING STORAGE DEVICE USING THE SAME

CROSS-REFERENCE TO RELATED APPLICATION

This application claims priority under 35 U.S.C. § 119 to Korean Patent Application No. 10-2021-0182923, filed on Dec. 20, 2021 in the Korean Intellectual Property Office (KIPO), the disclosure of which is incorporated by reference herein in its entirety.

TECHNICAL FIELD

Example embodiments relate generally to semiconductor integrated circuits, and more particularly, to methods of writing data in storage devices and methods of reading data from storage devices using sensor information, storage devices performing the methods of writing/reading data, and methods of operating storage devices using the methods of writing/reading data.

DISCUSSION OF RELATED ART

One or more semiconductor memory devices may be used in data storage devices. Examples of such data storage devices include solid state drives (SSDs). These types of data storage devices may have various design and/or performance advantages over hard disk drives (HDDs). Examples of potential advantages include the absence of moving mechanical parts, higher data access speeds, stability, durability, and/or low power consumption. Various systems, e.g., a laptop computer, a car, an airplane, a drone, etc., have adopted SSDs for data storage.

SUMMARY

At least one example embodiment of the present disclosure provides a method of writing data in a storage device capable of efficiently storing the data using information obtained from an internal sensor included in the storage device.

At least one example embodiment of the present disclosure provides a method of reading data from a storage device capable of efficiently retrieving the data stored using the method of writing data.

At least one example embodiment of the present disclosure provides a storage device performing the method of writing data and the method of reading data, and a method of operating a storage device using the method of writing data and the method of reading data.

According to example embodiments, in a method of writing data in a storage device, a data write request is received from a host device. Spatial information is received from a spatial sensor included in the storage device based on the data write request. A logical storage area management table is updated based on the data write request and the spatial information such that target data to be stored is written into a target storage area corresponding to the spatial information among a plurality of logical storage areas. A program command and the target data are transmitted to a nonvolatile memory such that the target data is programmed into a physical storage area in the nonvolatile memory corresponding to the target storage area.

According to example embodiments, in a method of reading data from a storage device, spatial information and a data read request are received from a host device. A target storage area and a physical storage area are selected based on the spatial information and the data read request. Target data to be read and corresponding to the data read request is stored in the target storage area corresponding to the spatial information among a plurality of logical storage areas. The physical storage area in a nonvolatile memory corresponds to the target storage area. A read command is transmitted to the nonvolatile memory such that the target data is retrieved from the physical storage area corresponding to the target storage area.

According to example embodiments, a storage device includes a storage controller, a nonvolatile memory controlled by the storage controller, and a spatial sensor communicating with the storage controller. The storage controller receives a data write request from a host device, receives first spatial information from the spatial sensor based on the data write request, updates a logical storage area management table based on the data write request and the first spatial information such that first target data to be stored is written into a first target storage area corresponding to the first spatial information among a plurality of logical storage areas, and transmits a program command and the first target data to the nonvolatile memory such that the first target data is programmed into a first physical storage area in the nonvolatile memory corresponding to the first target storage area.

According to example embodiments, in a method of operating a storage device, a data write operation is performed based on first spatial information received from a spatial sensor included in the storage device. A data read operation is performed based on second spatial information received from a host device. When performing the data write operation, a data write request is received from the host device. The first spatial information is received from the spatial sensor based on the data write request. A logical storage area management table is updated based on the data write request and the first spatial information such that first target data to be stored is written into a first target storage area corresponding to the first spatial information among a plurality of logical storage areas. A program command and the first target data are transmitted to a nonvolatile memory such that the first target data is programmed into a first physical storage area in the nonvolatile memory corresponding to the first target storage area. When performing the data read operation, the second spatial information and a data read request are received from the host device. A second target storage area and a second physical storage area are selected based on the second spatial information and the data read request. Second target data to be read and corresponding to the data read request is stored in the second target storage area corresponding to the second spatial information among the plurality of logical storage areas. The second physical storage area in the nonvolatile memory corresponds to the second target storage area. A read command is transmitted to the nonvolatile memory such that the second target data is retrieved from the second physical storage area corresponding to the second target storage area. The second target data is received from the nonvolatile memory. The second target data is transmitted to the host device. The plurality of logical storage areas include first to N-th logical storage areas, where N is a natural number greater than or equal to two. Each of the first to N-th logical storage areas includes first to M-th logical sub-storage areas, where M is a natural number greater than or equal to two. An X-th logical storage area corresponding to the first spatial information is selected from among the first to N-th logical storage areas, where X is a natural number greater than or equal to one and less than or equal to N, a Y-th logical sub-storage area corresponding to the first spatial information is selected from among the first to M-th logical sub-storage areas included in the X-th logical storage area, where Y is a natural number greater than or equal to one and less than or equal to M, and the Y-th logical sub-storage area included in the X-th logical storage area is set as the target storage area.

In the method of writing data in the storage device, the method of reading data from the storage device, the storage device and the method of operating the storage device according to example embodiments, the storage device may determine the logical location in which data is to be stored using sensor information detected from an internal sensor, and the storage device may determine the logical location from which data is to be read using sensor information received from the host device. For example, the target data may be stored or written into the target storage area using the spatial information obtained from the spatial sensor, and the target data may be retrieved from the target storage area using the spatial information received from the host device. For example, only data corresponding to specific spatial information may be stored in a specific logical location, it may be inferred that data stored in a specific logical location corresponds to specific spatial information, and thus, data requiring spatial information may not be stored together with spatial information. Accordingly, a size of write data may be reduced because an operation of storing spatial information is omitted, it may be efficient to collect data corresponding to specific spatial information, and the storage device may have increased performance and efficiency.

BRIEF DESCRIPTION OF THE DRAWINGS

Illustrative, non-limiting example embodiments will be more clearly understood from the following detailed description taken in conjunction with the accompanying drawings.

FIGS. 12A, 12B, 12C and 12D are diagrams for describing operations of FIGS. 7 and 11 according to example embodiments.

DETAILED DESCRIPTION OF THE EMBODIMENTS

Figure 1:
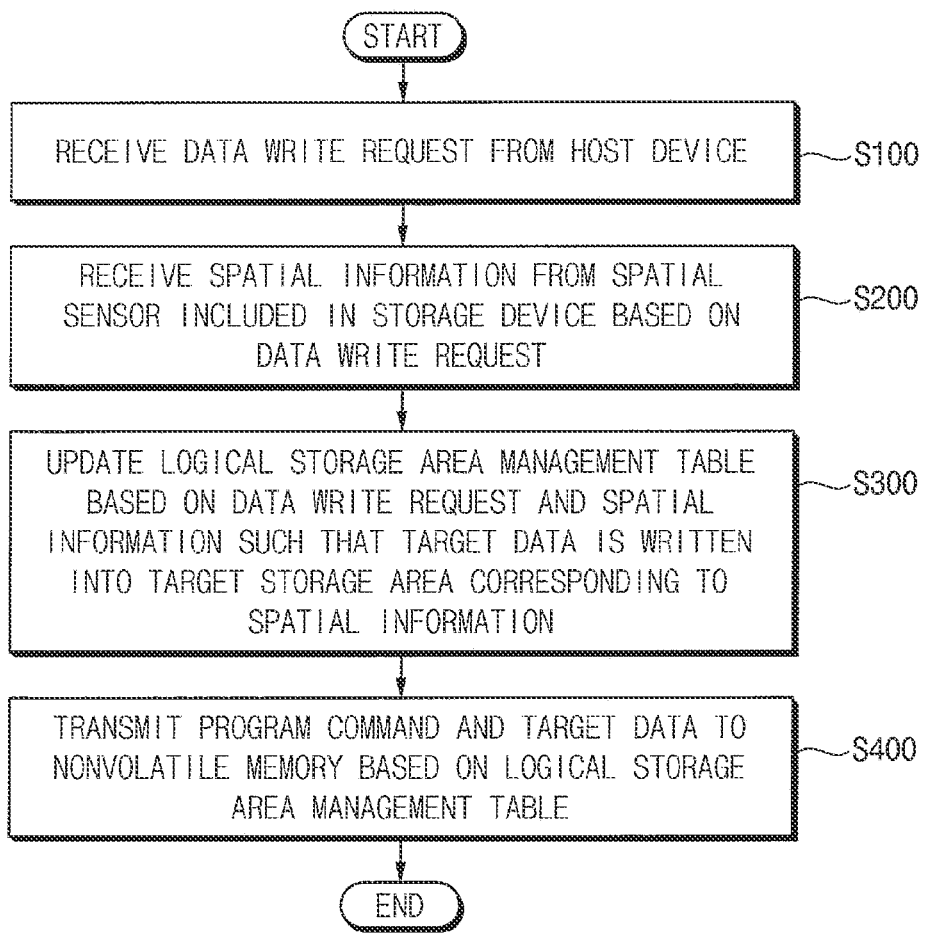
FIG. 1 is a flowchart illustrating a method of writing data in a storage device according to example embodiments.

Example embodiments of the present disclosure will be described more fully hereinafter with reference to the accompanying drawings. Like reference numerals may refer to like elements throughout the accompanying drawings.

It will be understood that when a component is referred to as being "on", "connected to", "coupled to", or "adjacent to" another component, it can be directly on, connected, coupled, or adjacent to the other component, or intervening components may be present. Other words used to describe the relationships between components should be interpreted in a like fashion.

It will be understood that the terms "first," "second," "third," etc. are used herein to distinguish one element from another, and the elements are not limited by these terms. Thus, a "first" element in an example embodiment may be described as a "second" element in another example embodiment.

It should be understood that descriptions of features or aspects within each example embodiment should typically be considered as available for other similar features or aspects in other example embodiments, unless the context clearly indicates otherwise.

As used herein, the singular forms "a", "an" and "the" are intended to include the plural forms as well, unless the context clearly indicates otherwise.

Herein, when two or more components or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to example embodiments, the parameter may be exactly the certain value or approximately the certain value within a measurement error as would be understood by a person having ordinary skill in the art. Further, when two or more processes or events are described as being performed at or occurring at substantially the same time, it is to be understood that the processes or events may be performed at or may occur at exactly the same time, or at about the same time as would be understood by a person having ordinary skill in the art. For example, the processes or events may be performed at or may occur at about the same time within a measurement error as would be understood by a person having ordinary skill in the art. Other uses of these terms and similar terms to describe the relationships between components, values, processes and events should be interpreted in a like fashion.

FIG. 1 is a flowchart illustrating a method of writing data in a storage device according to example embodiments.

Referring to FIG. 1, a method of writing data according to example embodiments is performed by a storage device that includes a storage controller, a nonvolatile memory and a spatial sensor. The storage device may operate based on a request received from a host device disposed outside the storage device. Configurations of the storage device and a storage system including the storage device will be described in detail with reference to FIG. 2.

In the method of writing data in the storage device according to example embodiments, a data write request is received from the host device (operation S100). For example, a data write operation according to example embodiments may be started based on the data write request received from the host device. A request received from the host device may be referred to as a host command, and the data write request may be referred to as a write host command.

Based on the data write request, spatial information is received from the spatial sensor inside or included in the storage device (operation S200). For example, current spatial information of a current time point at which the data write request is received may be received.

In some example embodiments, when the spatial sensor includes a gyroscope sensor, the spatial information may include azimuth information. In some example embodiments, when the spatial sensor includes an altitude sensor, the spatial information may include altitude information. However, example embodiments are not limited thereto, and the spatial sensor and the spatial information may be variously determined according to example embodiments.

Based on the data write request and the spatial information, a logical storage area management table is updated such that target data (e.g., write data) to be stored is written into a target storage area corresponding to the spatial information among a plurality of logical storage areas (operation S300). For example, a logical location or position corresponding to the current spatial information may be determined and designated for the target data. Configurations of the plurality of logical storage areas will be described with reference to FIGS. 5A, 5B, 5C, 6A and 6B. Examples of operation S300 will be described with reference to FIGS. 7, 8, 9, 10A, 10B, 10C, 10D, 11, 12A, 12B, 12C, 12D, 13, 14A, 14B, 14C and 14D.

Based on the logical storage area management table, a program command and the target data are transmitted to the nonvolatile memory such that the target data is programmed into a physical storage area in the nonvolatile memory corresponding to the target storage area (operation S400). For example, after the logical location is determined and designated for the target data, the target data may be actually programmed into a physical location corresponding to the logical location. A command transmitted to the nonvolatile memory may be referred to as a memory command, which is to be distinguished from the host command received from the host device, and the program command may be referred to as a program memory command.

In some example embodiments, operations S100, S200, S300 and S400 may be performed by the storage controller.

In the method of writing data in the storage device according to example embodiments, the storage device may determine the logical location in which data is to be stored using sensor information detected from an internal sensor. For example, the target data may be stored or written into the target storage area using the spatial information obtained from the spatial sensor. For example, only data corresponding to specific spatial information may be stored in a specific logical location, and it may be thus inferred that data stored in a specific logical location corresponds to specific spatial information. As a result, according to example embodiments, data requiring spatial information is not stored together with spatial information. Accordingly, in example embodiments, a size of write data may be reduced because an operation of storing spatial information is omitted, and data corresponding to specific spatial information may be more efficiently collected. As a result, the storage device according to example embodiments may have increased performance and efficiency.

Figure 2:
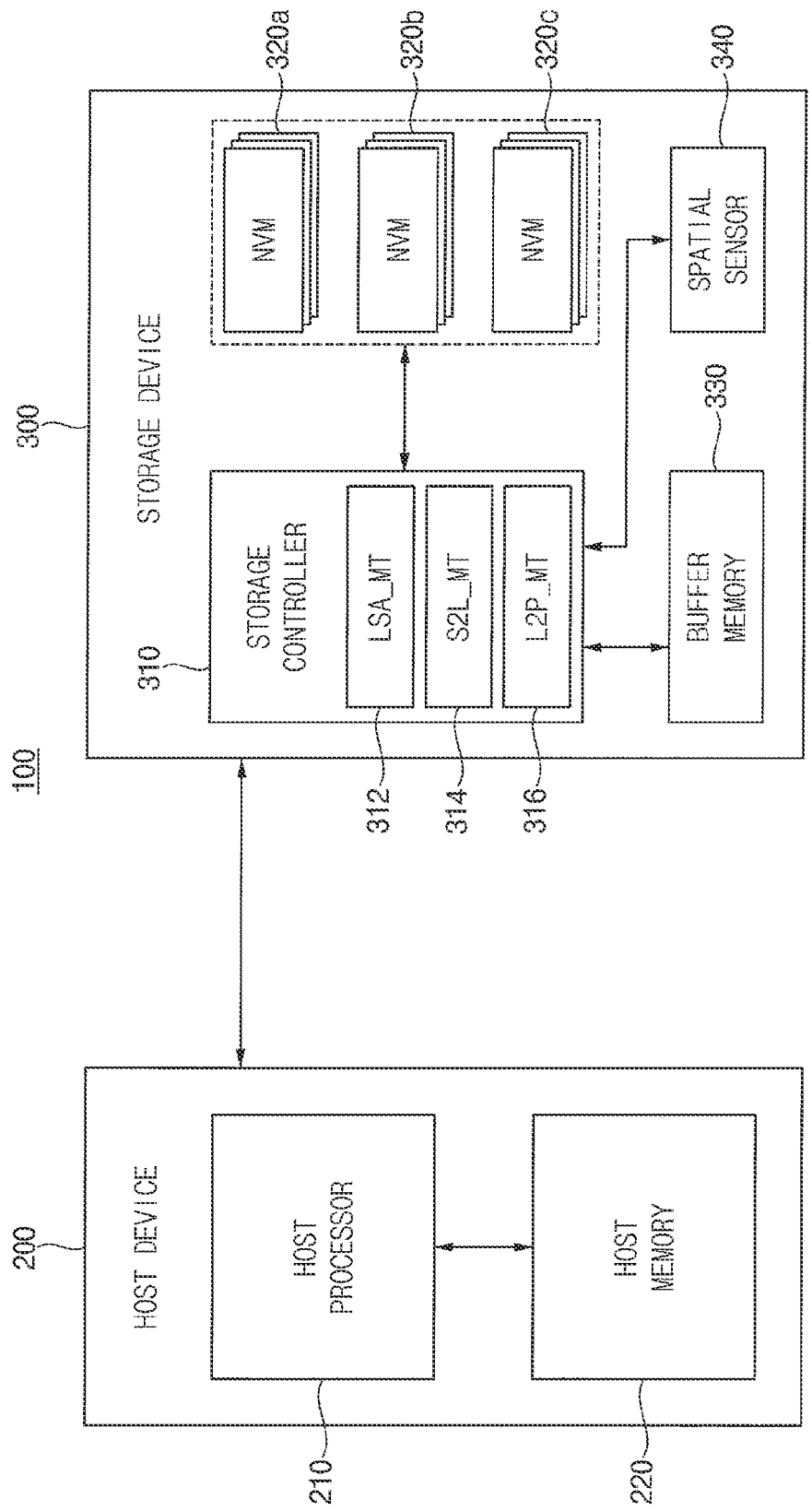
FIG. 2 is a block diagram illustrating a storage device and a storage system including the storage device according to example embodiments.

FIG. 2 is a block diagram illustrating a storage device and a storage system including the storage device according to example embodiments.

Referring to FIG. 2, a storage system 100 includes a host device 200 and a storage device 300.

The host device 200 controls overall operations of the storage system 100. The host device 200 may include a host processor 210 and a host memory 220.

The host processor 210 may control an operation of the host device 200. For example, the host processor 210 may execute an operating system (OS). The operating system may include, for example, a file system for file management and a device driver for controlling peripheral devices including the storage device 300 at the operating system level. For example, the host processor 210 may include at least one of various processing units, e.g., a central processing unit (CPU), etc.

The host memory 220 may store instructions and/or data that are executed and/or processed by the host processor 210. For example, the host memory 220 may include at least one of various volatile memories, e.g., a dynamic random access memory (DRAM), etc.

In some example embodiments, as will be described with reference to FIGS. 6A and 6B, the host device 200 may execute a plurality of applications and/or a plurality of virtual machines that are different from each other and are driven or run on the operating system.

The storage device 300 is accessed by the host device 200. The storage device 300 may include a storage controller 310, a plurality of nonvolatile memories 320a, 320b and 320c, a buffer memory 330 and a spatial sensor 340.

The storage controller 310 may control an operation of the storage device 300, e.g., a data write operation and/or a data read operation, based on a request and data that are received from the host device 200.

The plurality of nonvolatile memories 320a to 320c may be controlled by the storage controller 310, and may store a plurality of data. For example, the plurality of nonvolatile memories 320a to 320c may store meta data, various user data, etc.

In some example embodiments, each of the plurality of nonvolatile memories 320a to 320c may include a NAND flash memory. In some example embodiments, each of the plurality of nonvolatile memories 320a to 320c may include one of, for example, an electrically erasable programmable read only memory (EEPROM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc.

The buffer memory 330 may store instructions and/or data that are executed and/or processed by the storage controller 310, and may temporarily store data stored in or to be stored into the plurality of nonvolatile memories 320a to 320c. For example, the buffer memory 330 may include at least one of various volatile memories, e.g., a static random access memory (SRAM), a DRAM, etc.

The spatial sensor 340 may communicate with the storage controller 310. For example, the spatial sensor 340 may transmit spatial information to the storage controller 310, and may additionally transmit a warning signal to the storage controller 310. In an example embodiment, the spatial sensor 340 may be disposed outside the storage controller 310, as illustrated in FIG. 2. In an example embodiment, the spatial sensor 340 may be disposed inside the storage controller 310.

In some example embodiments, the spatial sensor 340 may include at least one of a gyroscope sensor, an acceleration sensor and an altitude sensor. For example, the spatial information may include at least one of azimuth information and altitude information. However, example embodiments are not limited thereto, and the spatial sensor 340 may include, for example, a pressure sensor, a magnetic field sensor, a proximity sensor, an ultrasonic sensor, an optical sensor, etc.

In addition, although example embodiments are described herein based on the spatial sensor 340, example embodiments are not limited thereto. For example, the storage device 300 may include at least one of various environmental sensors that collect various environmental information, such as, for example, a temperature sensor, a humidity sensor, a temporal sensor, an illumination sensor, a vibration sensor, a mechanical stress sensor, a shock sensor, a radiation sensor, a dust sensor, an electrical stress sensor, etc., and the storage device 300 may operate based on the environmental information received from the environmental sensor (e.g., by determining and designating a logical location corresponding to specific environmental information).

To perform operations according to example embodiments, the storage controller 310 may include a logical storage area management table (LSA_MT) 312 and a spatial information-to-storage location mapping table (S2L_MT) 314, and may further include a logical-to-physical address mapping table (L2P_MT) 316.

As will be described with reference to FIGS. 5A, 5B, 5C, 6A and 6B, the storage device 300 implemented with one physical device may be partitioned or divided into a plurality of logical storage areas or logical devices, and each logical storage area may be used as a separate, individual and/or independent storage space. The logical storage area management table 312 may be used to manage or treat the plurality of logical storage areas.

As described with reference to FIG. 1, only data corresponding to specific spatial information may be stored in a specific logical storage area. The spatial information-to-storage location mapping table 314 may represent or include a relationship between the spatial information and the logical storage area.

In an example embodiment, the logical storage area management table 312 may be updated by selecting the target storage area from among the plurality of logical storage areas based on the spatial information and the spatial information-to-storage location mapping table, and the target data may be mapped to the target storage area in the logical storage area management table 312.

The logical-to-physical address mapping table 316 may represent or include a relationship between a logical address, which is received from the host device 200 and corresponds to the logical storage area, and a physical address, which corresponds to a physical storage area in which data is actually stored in the plurality of nonvolatile memories 320a to 320c.

Configurations of the logical storage area management table 312, the spatial information-to-storage location mapping table 314 and the logical-to-physical address mapping table 316 will be described with reference to FIGS. 10A, 10C, 10D, 12A, 12C, 12D, 14A, 14C and 14D.

The storage controller 310 may perform the method of writing data according to example embodiments described with reference to FIG. 1. For example, the storage controller 310 may receive a data write request from the host device 200, may receive first spatial information from the spatial sensor 340 based on the data write request, may update the logical storage area management table 312 based on the data write request and the first space information such that first target data to be stored is written into a first target storage area corresponding to the first spatial information among the plurality of logical storage areas, and may transmit a program command and the first target data to the plurality of nonvolatile memories 320a to 320c such that the first target data is programmed into a first physical storage area in the plurality of nonvolatile memories 320a to 320c corresponding to the first target storage area.

In addition, the storage controller 310 may perform a method of reading data according to example embodiments, which will be described with reference to FIG. 18. For example, the storage controller 310 may receive second spatial information and a data read request from the host device 200, and may select a second target storage area and a second physical storage area based on the second spatial information and the data read request. Second target data to be read and corresponding to the data read request may be stored in the second target storage area corresponding to the second spatial information among the plurality of logical storage areas, and the second physical storage area in the plurality of nonvolatile memories 320a to 320c may correspond to the second target storage area. The storage controller 310 may transmit a read command to the plurality of nonvolatile memories 320a to 320c such that the second target data is retrieved from the second physical storage area corresponding to the second target storage area.

In some example embodiments, the storage device 300 may be, for example, a solid state drive (SSD), a universal flash storage (UFS), a multi-media card (MMC) or an embedded multi-media card (eMMC). In some example embodiments, the storage device 300 may be one of, for example, a secure digital (SD) card, a micro SD card, a memory stick, a chip card, a universal serial bus (USB) card, a smart card, a compact flash (CF) card, etc.

In some example embodiments, the storage device 300 may be connected to the host device 200 via a block accessible interface which may include, for example, a UFS, an eMMC, a nonvolatile memory express (NVMe) bus, a serial advanced technology attachment (SATA) bus, a small computer small interface (SCSI) bus, a serial attached SCSI (SAS) bus, etc. The storage device 300 may use a block accessible address space corresponding to an access size of the plurality of nonvolatile memories 320a to 320c to provide the block accessible interface to the host device 200, for allowing the access by units of a memory block with respect to data stored in the plurality of nonvolatile memories 320a to 320c.

In some example embodiments, the storage system 100 may be any mobile system, such as, for example, a mobile phone, a smartphone, a tablet computer, a laptop computer, a personal digital assistant (PDA), a portable multimedia player (PMP), a digital camera, a portable game console, a music player, a camcorder, a video player, a navigation device, a wearable device, an Internet of Things (IoT) device, an Internet of Everything (IoE) device, an e-book reader, a virtual reality (VR) device, an augmented reality (AR) device, a robotic device, a drone, an automotive device, etc.

Figure 3:
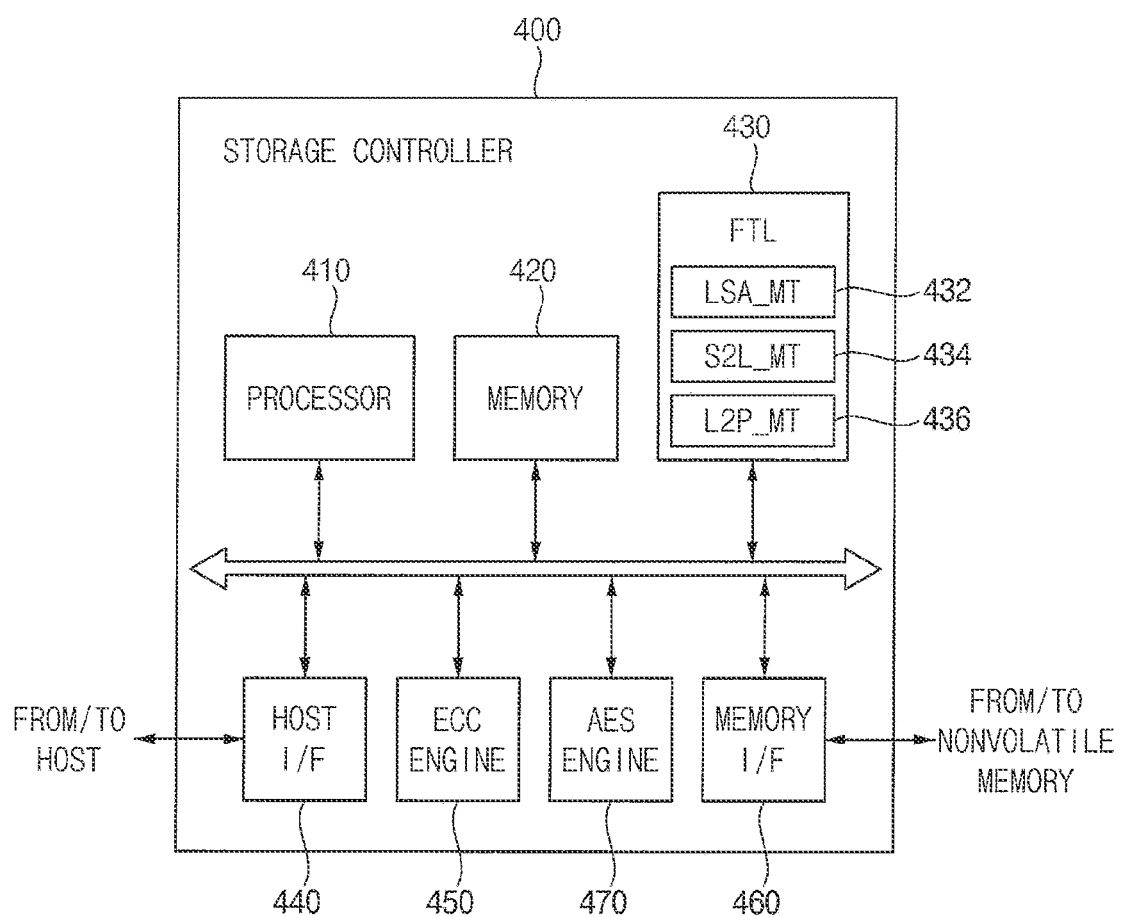
FIG. 3 is a block diagram illustrating an example of a storage controller included in a storage device according to example embodiments.

FIG. 3 is a block diagram illustrating an example of a storage controller included in a storage device according to example embodiments.

Referring to FIG. 3, a storage controller 400 may include a processor 410, a memory 420, a flash translation layer (FTL) 430, a host interface 440, an error correction code (ECC) engine 450, a memory interface 460 and an advanced encryption standard (AES) engine 470.

The processor 410 may control an operation of the storage controller 400 in response to a command received via the host interface 440 from a host device (e.g., the host device 200 in FIG. 2). For example, the processor 410 may control an operation of a storage device (e.g., the storage device 300 in FIG. 2), and may control respective components by employing firmware for operating the storage device.

The memory 420 may store instructions and data executed and processed by the processor 410. For example, the memory 420 may be implemented with a volatile memory, such as a DRAM, a SRAM, a cache memory, etc.

The flash translation layer 430 may perform various functions, such as, for example, an address mapping operation, a wear-leveling operation, a garbage collection operation, etc. The address mapping operation may be an operation of converting a logical address received from the host device into a physical address used to actually store data in a nonvolatile memory (e.g., the nonvolatile memories 320a to 320c in FIG. 2). The wear-leveling operation may be a technique for preventing excessive deterioration of a specific block by allowing blocks of the nonvolatile memory to be uniformly used. As an example, the wear-leveling operation may be implemented using a firmware technique that balances erase counts of physical blocks. The garbage collection operation may be a technique for ensuring usable capacity in the nonvolatile memory by erasing an existing block after copying valid data of the existing block to a new block.

The flash translation layer 430 may manage a logical storage area management table 432, a spatial information-to-storage location mapping table 434 and a logical-to-physical address mapping table 436 that are used to perform the method of writing data and/or the method of reading data according to example embodiments. The logical storage area management table 432, the spatial information-to-storage location mapping table 434 and the logical-to-physical address mapping table 436 may be substantially the same as the logical storage area management table 312, the spatial information-to-storage location mapping table 314 and the logical-to-physical address mapping table 316 in FIG. 2.

The ECC engine 450 for error correction may perform coded modulation using, for example, a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., or may perform ECC encoding and ECC decoding using above-described codes or other error correction codes.

The host interface 440 may provide physical connections between the host device and the storage device. The host interface 440 may provide an interface corresponding to a bus format of the host device for communication between the host device and the storage device. In some example embodiments, the bus format of the host device may be, for example, a small computer system interface (SCSI) or a serial attached SCSI (SAS) interface. In some example embodiments, the bus format of the host device may be, for example, a USB, a peripheral component interconnect (PCI) express (PCIe), an advanced technology attachment (ATA), a parallel ATA (PATA), a serial ATA (SATA), a nonvolatile memory (NVM) express (NVMe), etc., format.

The memory interface 460 may exchange data with the nonvolatile memory. The memory interface 460 may transfer data to the nonvolatile memory, or may receive data read from the nonvolatile memory. In some example embodiments, the memory interface 460 may be connected to the nonvolatile memory via one channel. In some example embodiments, the memory interface 460 may be connected to the nonvolatile memory via two or more channels. For example, the memory interface 460 may be configured to comply with a standard protocol, such as, for example, Toggle or open NAND flash interface (ONFI).

The AES engine 470 may perform at least one of an encryption operation and a decryption operation on data input to the storage controller 400 by using a symmetric-key algorithm. According to example embodiments, the AES engine 470 may include an encryption module and a decryption module. In an example embodiment, the encryption module and the decryption module may be implemented as separate modules. In an example embodiment, one module capable of performing both encryption and decryption operations may be implemented in the AES engine 470.

Figure 4:
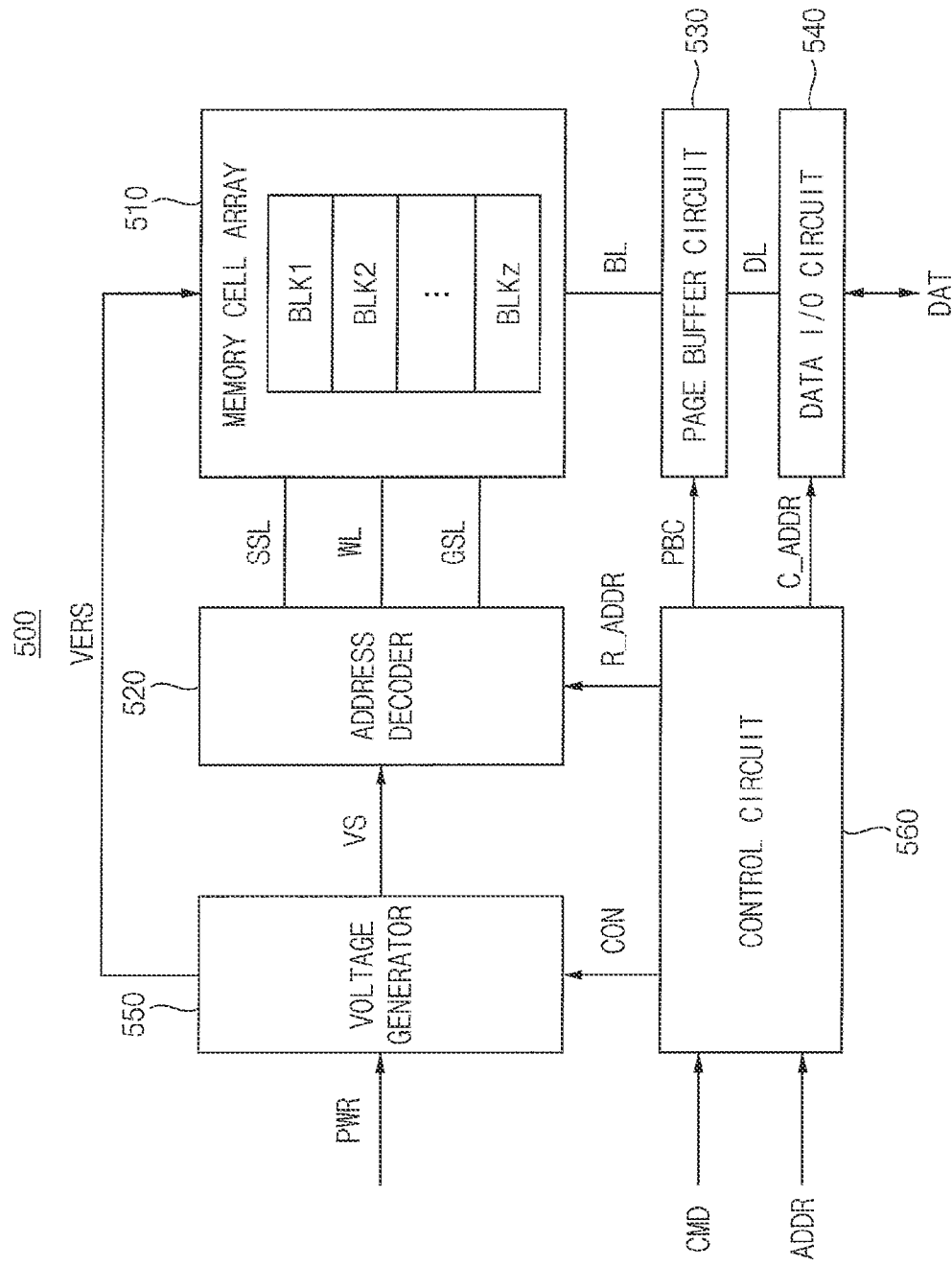
FIG. 4 is a block diagram illustrating a nonvolatile memory included in a storage device according to example embodiments.

FIG. 4 is a block diagram illustrating a nonvolatile memory included in a storage device according to example embodiments.

Referring to FIG. 4, a nonvolatile memory 500 includes a memory cell array 510, an address decoder 520, a page buffer circuit 530, a data input/output (I/O) circuit 540, a voltage generator 550 and a control circuit 560.

The memory cell array 510 is connected to the address decoder 520 via a plurality of string selection lines SSL, a plurality of wordlines WL and a plurality of ground selection lines GSL. The memory cell array 510 is further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, . . . , BLKz, each of which includes memory cells, where z is a positive integer. In addition, each of the plurality of memory blocks BLK1 to BLKz may be divided into a plurality of pages.

In some example embodiments, the plurality of memory cells included in the memory cell array 510 may be arranged in a two-dimensional (2D) array structure or a three-dimensional (3D) vertical array structure. The 3D vertical array structure may include vertical cell strings that are vertically oriented such that at least one memory cell is located over another memory cell. The at least one memory cell may comprise a charge trap layer. The following patent documents, which are hereby incorporated by reference in their entirety, describe suitable configurations for a memory cell array including a 3D vertical array structure, in which the three-dimensional memory array is configured as a plurality of levels, with wordlines and/or bitlines shared between levels: U.S. Pat. Nos. 7,679,133; 8,553,466; 8,654,587; 8,559,235; and US Pat. Pub. No. 2011/0233648.

The control circuit 560 receives a command CMD and an address ADDR from outside of the nonvolatile memory 500 (e.g., from the storage controller 310 in FIG. 2), and controls erasure, programming and read operations of the nonvolatile memory 500 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recovery read operation.

For example, the control circuit 560 may generate control signals CON, which are used for controlling the voltage generator 550, and may generate control signal PBC for controlling the page buffer circuit 530, based on the command CMD, and may generate a row address R_ADDR and a column address C_ADDR based on the address ADDR. The control circuit 560 may provide the row address R_ADDR to the address decoder 520 and may provide the column address C_ADDR to the data I/O circuit 540.

The address decoder 520 may be connected to the memory cell array 510 via the plurality of string selection lines SSL, the plurality of wordlines WL and the plurality of ground selection lines GSL.

For example, in the data erase/write/read operations, the address decoder 520 may determine at least one of the plurality of wordlines WL as a selected wordline, and may determine the rest or remainder of the plurality of wordlines WL other than the selected wordline as unselected wordlines, based on the row address R_ADDR.

In addition, in the data erase/write/read operations, the address decoder 520 may determine at least one of the plurality of string selection lines SSL as a selected string selection line, and may determine the rest or remainder of the plurality of string selection lines SSL other than the selected string selection line as unselected string selection lines, based on the row address R_ADDR.

Further, in the data erase/write/read operations, the address decoder 520 may determine at least one of the plurality of ground selection lines GSL as a selected ground selection line, and may determine the rest or remainder of the plurality of ground selection lines GSL other than the selected ground selection line as unselected ground selection lines, based on the row address R_ADDR.

The voltage generator 550 may generate voltages VS that are utilized for an operation of the nonvolatile memory 500 based on a power PWR and the control signals CON. The voltages VS may be applied to the plurality of string selection lines SSL, the plurality of wordlines WL and the plurality of ground selection lines GSL via the address decoder 520. In addition, the voltage generator 550 may generate an erase voltage VERS that is utilized for the data erase operation based on the power PWR and the control signals CON. The erase voltage VERS may be applied to the memory cell array 510 directly or via the bitline BL.

For example, during the erase operation, the voltage generator 550 may apply the erase voltage VERS to a common source line and/or the bitline BL of a memory block (e.g., a selected memory block) and may apply an erase permission voltage (e.g., a ground voltage) to all wordlines of the memory block or a portion of the wordlines via the address decoder 520. In addition, during the erase verification operation, the voltage generator 550 may apply an erase verification voltage simultaneously to all wordlines of the memory block or sequentially to the wordlines one by one.

For example, during the program operation, the voltage generator 550 may apply a program voltage to the selected wordline and may apply a program pass voltage to the unselected wordlines via the address decoder 520. In addition, during the program verification operation, the voltage generator 550 may apply a program verification voltage to the selected wordline and may apply a verification pass voltage to the unselected wordlines via the address decoder 520.

In addition, during the normal read operation, the voltage generator 550 may apply a read voltage to the selected wordline and may apply a read pass voltage to the unselected wordlines via the address decoder 520. During the data recovery read operation, the voltage generator 550 may apply the read voltage to a wordline adjacent to the selected wordline and may apply a recovery read voltage to the selected wordline via the address decoder 520.

The page buffer circuit 530 may be connected to the memory cell array 510 via the plurality of bitlines BL. The page buffer circuit 530 may include a plurality of page buffers. In some example embodiments, each page buffer may be connected to one bitline. In some example embodiments, each page buffer may be connected to two or more bitlines.

The page buffer circuit 530 may store data DAT to be programmed into the memory cell array 510 or may read data DAT sensed from the memory cell array 510. For example, the page buffer circuit 530 may operate as a write driver or a sensing amplifier according to an operation mode of the nonvolatile memory 500.

The data I/O circuit 540 may be connected to the page buffer circuit 530 via data lines DL. The data I/O circuit 540 may provide the data DAT from the outside of the nonvolatile memory 500 to the memory cell array 510 via the page buffer circuit 530 or may provide the data DAT from the memory cell array 510 to the outside of the nonvolatile memory 500, based on the column address C_ADDR.

Although the nonvolatile memory according to example embodiments is described herein based on a NAND flash memory, the nonvolatile memory according to example embodiments is not limited thereto. For example, the nonvolatile memory according to example embodiments may be any nonvolatile memory, e.g., a phase random access memory (PRAM), a resistive random access memory (RRAM), a nano floating gate memory (NFGM), a polymer random access memory (PoRAM), a magnetic random access memory (MRAM), a ferroelectric random access memory (FRAM), a thyristor random access memory (TRAM), etc.

FIGS. 5A, 5B, 5C, 6A and 6B are diagrams for describing an operation of generating, setting and/or managing logical storage areas in a storage device according to example embodiments.

The storage device according to example embodiments may operate based on a nonvolatile memory express (NVMe) protocol, and may support a namespace function and/or a zoned namespace (ZNS) function. The NVMe may be an interface of a register level that performs a communication between a storage device such as a solid state drive (SSD) and host software. The NVMe may be based on a conventional peripheral component interconnect express (PCIe) bus, and may be an interface designed or, alternatively, optimized for an SSD. When the namespace function is used, a storage device implemented with one physical device may be partitioned into a plurality of logical devices (e.g., a plurality of namespaces), and data may be managed based on the plurality of namespaces. When the zoned namespace function is used, one namespace may be additionally partitioned into a plurality of zones, and data may be managed based on the plurality of namespaces and the plurality of zones. All of the plurality of namespaces and the plurality of zones may be physically included in the same storage device, and each namespace and each zone may be used as a separate storage space.

Hereinafter, an operation of generating, setting and/or managing logical storage areas may be described based on an example where each logical storage area includes at least one of the namespace and the zone, e.g., based on the namespaces and/or the zones. However, example embodiments are not limited thereto, and the logical storage areas may be variously implemented according to example embodiments.

Figure 5A:
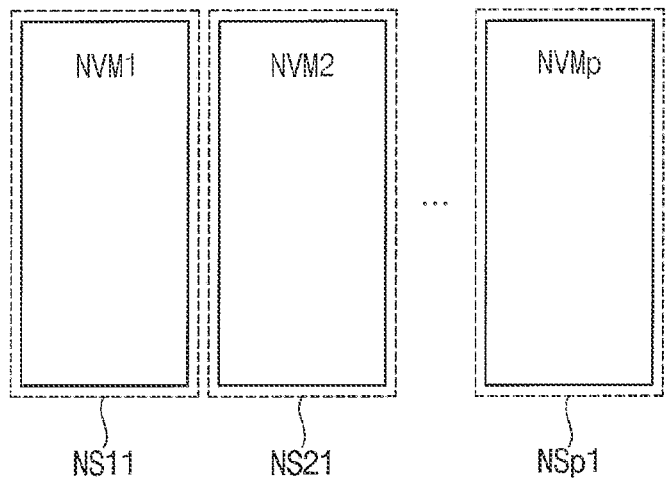
FIGS. 5A, 5B, 5C, 6A and 6B are diagrams for describing an operation of generating, setting and/or managing logical storage areas in a storage device according to example embodiments.

Referring to FIG. 5A, an example of generating and setting a plurality of namespaces NS11, NS21, . . . , NSp1 on a plurality of nonvolatile memories NVM1, NVM2, . . . . NVMp is illustrated, where p is a natural number greater than or equal to two. For example, the plurality of nonvolatile memories NVM1 to NVMp may be included in one storage device, and thus, the plurality of namespaces NS11 to NSp1 may also be included in one storage device.

In an example of FIG. 5A, one namespace may be generated and set on one nonvolatile memory. For example, the namespace NS11 may be generated and set on the entire region of the nonvolatile memory NVM1, the namespace NS21 may be generated and set on the entire region of the nonvolatile memory NVM2, and the namespace NSp1 may be generated and set on the entire region of the nonvolatile memory NVMp.

In some example embodiments, the plurality of namespaces NS11 to NSp1 may have the same capacity or different capacities. Although FIG. 5A illustrates that the number of namespaces NS11 to NSp1 is equal to the number of nonvolatile memories NVM1 to NVMp, example embodiments are not limited thereto, and the number of namespaces and the number of nonvolatile memories may be variously determined according to example embodiments.

Figure 5B:
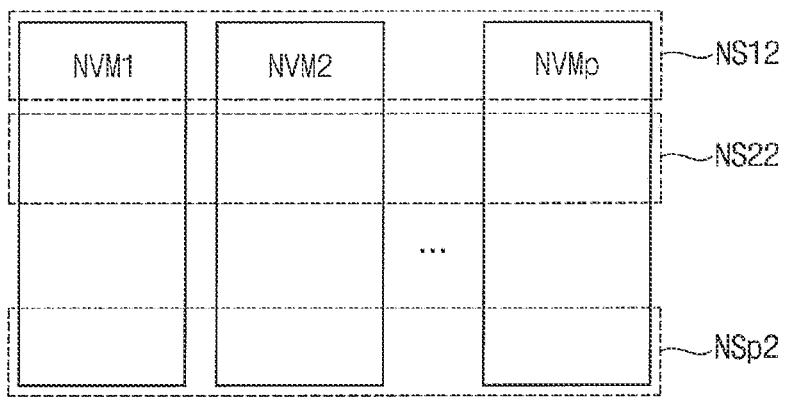

Referring to FIG. 5B, an example of generating and setting a plurality of namespaces NS12, NS22, . . . , NSp2 on a plurality of nonvolatile memories NVM1, NVM2, . . . , NVMp is illustrated. For convenience of explanation, a further description of components and technical aspects previously described with reference to FIG. 5A will be omitted.

In an example of FIG. 5B, one namespace may be generated and set on all of the plurality of nonvolatile memories NVM1 to NVMp. For example, the namespace NS12 may be generated and set on some regions of all of the plurality of nonvolatile memories NVM1 to NVMp, the namespace NS22 may be generated and set on some other regions of all of the plurality of nonvolatile memories NVM1 to NVMp, and the namespace NSp2 may be generated and set on some other regions of all of the plurality of nonvolatile memories NVM1 to NVMp.

According to example embodiments, the operation of generating and setting the namespaces may be variously implemented. For example, one namespace may be generated and set on the entire regions or partial regions of some nonvolatile memories (e.g., the nonvolatile memories NVM1 and NVM2). For example, namespaces may be generated and set on memory blocks and pages rather than nonvolatile memories.

Figure 5C:
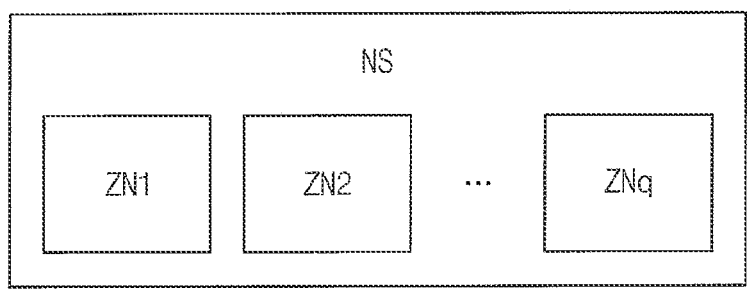

Referring to FIG. 5C, an example of generating and setting a plurality of zones ZN1, ZN2, . . . , ZNq on one namespace NS is illustrated, where q is a natural number greater than or equal to two. The namespace NS may correspond to one of the namespaces NS11 to NSp1 in FIG. 5A and the namespaces NS12 to NSp2 in FIG. 5B.

In some example embodiments, the operation of generating and setting the namespaces and/or the zones may be performed in advance at an initial operation time. In some example embodiments, the operation of generating and setting the namespaces and/or the zones may be performed in real-time or during runtime.

Figure 6A:
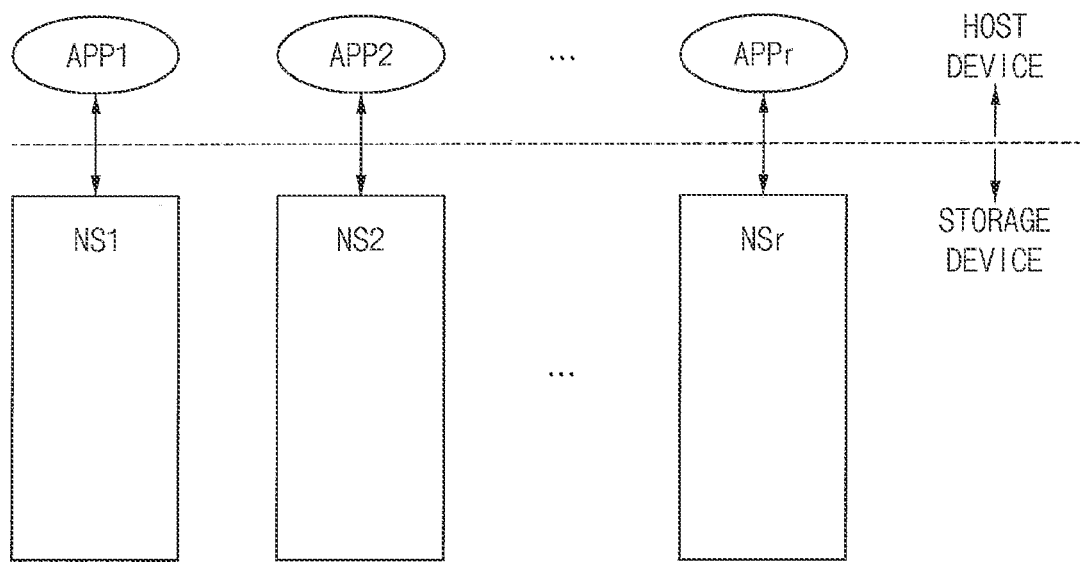

Referring to FIG. 6A, an example of allocating or assigning a plurality of namespaces NS1, NS2, . . . , NSr is illustrated, where r is a natural number greater than or equal to two. For example, the plurality of namespaces NS1 to NSr may be included in one storage device.

In an example of FIG. 6A, each of a plurality of applications APP1, APP2, . . . , APPr may be allocated to a respective one of the plurality of namespaces NS1 to NSr depending on the types and characteristics of the plurality of applications APP1 to APPr that are executed or run on a host device (e.g., the host device 200 in FIG. 2), were r is a positive integer. For example, the namespace NS1 may be allocated to the application APP1, the namespace NS2 may be allocated to the application APP2, and the namespace NSr may be allocated to the application APPr.

In some example embodiments, each of the plurality of applications APP1 to APPr may be referred to as an application program, and may be an application software program, and may be an application software program that is executed on an operating system. For example, each of the plurality of applications APP1 to APPr may be programmed to aid in generating, copying and deleting a file. For example, each of the plurality of applications APP1 to APPr may provide various services such as, for example, a video application, a game application, a web browser application, etc. Each of the plurality of applications APP1 to APPr may generate tasks, jobs and/or requests for using or accessing a respective one of the plurality of namespaces NS1 to NSr (e.g., for performing data write/read/erase operations on a respective one of the plurality of namespaces NS1 to NSr).

Figure 6B:
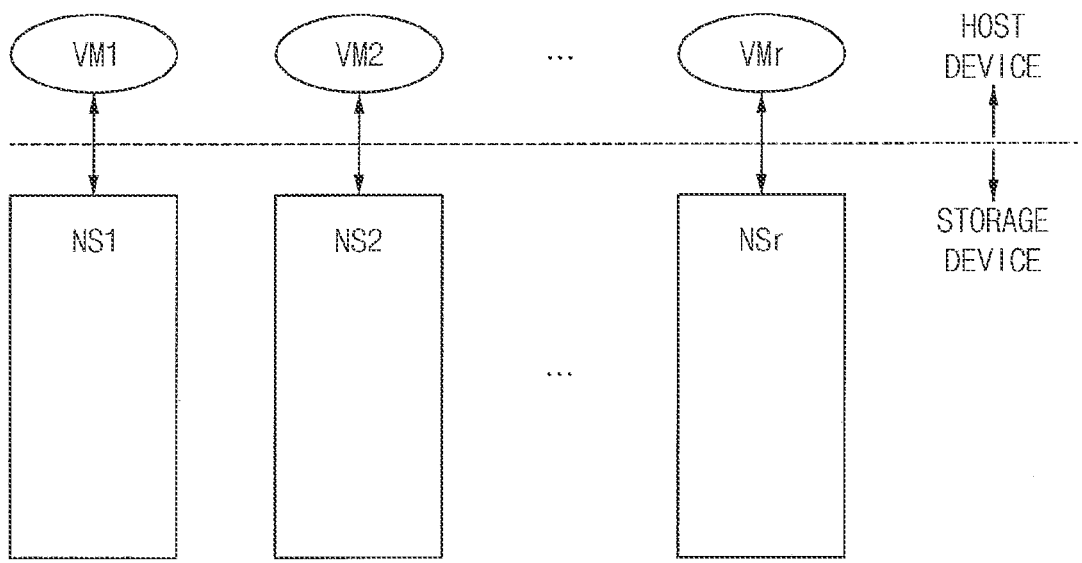

Referring to FIG. 6B, an example of allocating or assigning a plurality of namespaces NS1, NS2, . . . , NSr is illustrated. For convenience of explanation, a further description of components and technical aspects previously described with reference to FIG. 6A will be omitted.

In an example of FIG. 6B, each of a plurality of virtual machines VM1, VM2, . . . , VMr may be allocated to a respective one of the plurality of namespaces NS1 to NSr depending on the types and characteristics of the plurality of virtual machines VM1 to VMr that are executed or run on a host device. For example, the namespace NS1 may be allocated to the virtual machine VM1, the namespace NS2 may be allocated to the virtual machine VM2, and the namespace NSr may be allocated to the virtual machine VMr.

In some example embodiments, the host device may support a virtualization function. For example, each of the plurality of virtual machines VM1 to VMr may be a virtualization core or processor generated by a virtualization operation, and may drive an operating system (OS) or an application independently. For example, the virtualization function and the virtualization operation may be performed using a VMware, a Single-Root IO Virtualization (SR-IOV), etc. For example, an OS driven by a virtual machine may be referred to as, for example, a guest OS. Each of the plurality of virtual machines VM1 to VMr may generate tasks, jobs and/or requests for using or accessing a respective one of the plurality of namespaces NS1 to NSr (e.g., for performing data write/read/erase operations on a respective one of the plurality of namespaces NS1 to NSr).

Although FIGS. 6A and 6B illustrate that only one namespace is accessed by one application and/or one virtual machine, example embodiments are not limited thereto. For example, two or more namespaces may be accessed by one application and/or one virtual machine, one namespace may be accessed by two or more applications and/or two or more virtual machines, and an operation of accessing the namespace may be independent of the application and/or the virtual machine.

Figure 7:
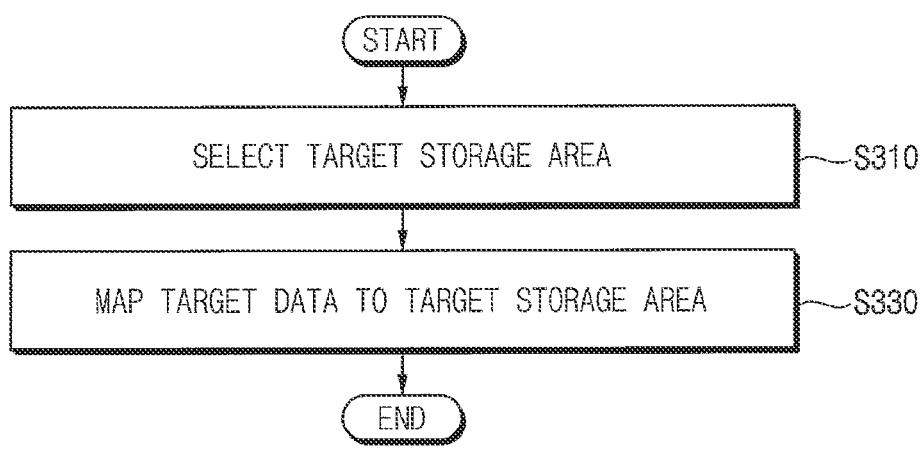
FIG. 7 is an example of updating a logical storage area management table in FIG. 1 according to example embodiments.

FIG. 7 is an example of updating a logical storage area management table in FIG. 1 according to example embodiments.

Referring to FIGS. 1 and 7, when updating the logical storage area management table (operation S300), the target storage area may be selected from among the plurality of logical storage areas based on the spatial information and a spatial information-to-storage location mapping table (operation S310). The target data may be mapped or matched to the target storage area in the logical storage area management table (operation S330).

The target data may be logically written into the target storage area by operation S300. However, in operation S300, in some examples, the target data is not actually programmed into the nonvolatile memory, and the target data may only be designated or mapped to the target storage area. As described with reference to FIG. 1, in operation S400, which may be performed after operation S300 in some example embodiments, the target data may be actually programmed into the physical storage area corresponding to the target storage area.

In some example embodiments, operations S300 and S400 may be performed substantially simultaneously or concurrently. For example, a host command (e.g., the data write request) and a memory command (e.g., the program command) may be substantially simultaneously executed.

In some example embodiments, operation S300 may be performed, and then operation S400 may be performed after a predetermined time has elapsed. For example, a plurality of host commands may be received and temporarily stored in a buffer memory or a queue, and then a plurality of memory commands corresponding to the plurality of host commands may be sequentially executed.

Figure 8:
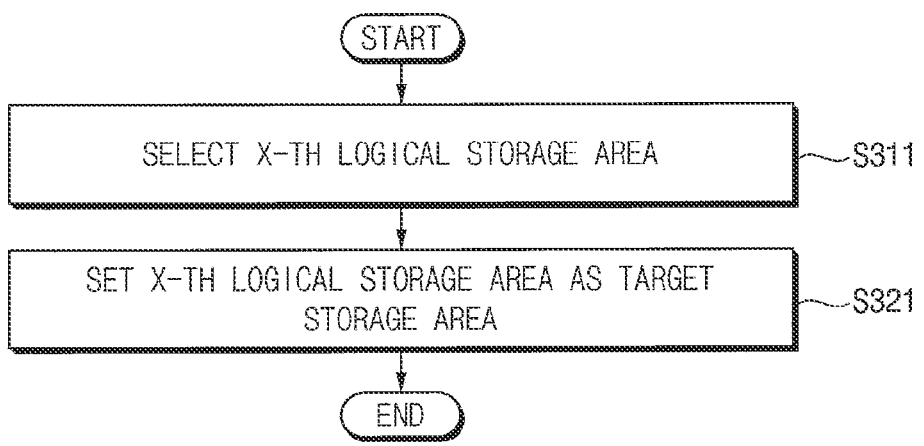
FIG. 8 is a flowchart illustrating an example of selecting a target storage area in FIG. 7 according to example embodiments.

FIG. 8 is a flowchart illustrating an example of selecting a target storage area in FIG. 7 according to example embodiments.

Referring to FIGS. 7 and 8, when selecting the target storage area (operation S310), the plurality of logical storage areas may include first to N-th logical storage areas, where N is a natural number greater than or equal to two.

An X-th logical storage area corresponding to the spatial information may be selected from among the first to N-th logical storage areas (operation S311), where X is a natural number greater than or equal to one and less than or equal to N. The X-th logical storage area may be set or determined as the target storage area (operation S321).

Figure 9:
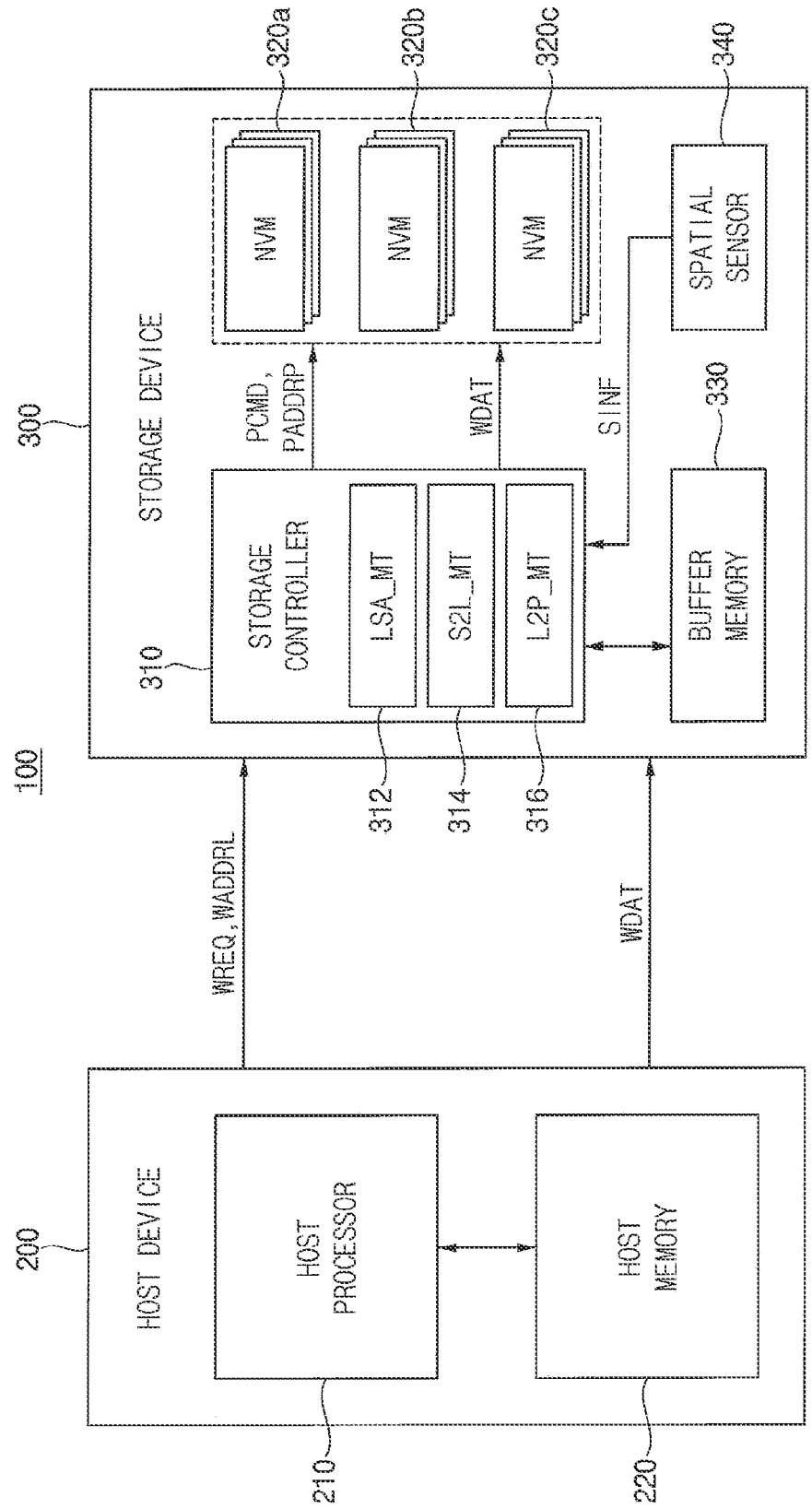
FIG. 9 is a diagram for describing an operation of FIG. 1 according to example embodiments.

FIG. 9 is a diagram for describing an operation of FIG. 1 according to example embodiments.

Referring to FIGS. 1 and 9, when the data write operation is performed, the storage controller 310 may receive a data write request WREQ, an address WADDRL, and target data WDAT to be stored, from the host device 200. Based on reception of the data write request WREQ, the storage controller 310 may receive spatial information SINF representing a current location of the storage device 300 from the spatial sensor 340. Using the spatial information-to-storage location mapping table 314, the storage controller 310 may update the logical storage area management table 312 such that the target data WDAT is written into the target storage area that is a logical storage area corresponding to the space information SINF. The storage controller 310 may transmit a program command PCMD, an address PADDRP, and the target data WDAT to the nonvolatile memories 320a to 320c such that the target data WDAT is programmed into the physical storage area corresponding to the target storage area, and may update the logical-to-physical address mapping table 316. For example, the address WADDRL may be a logical address (e.g., a logical block address (LBA), a logical page address (LPA), etc.), and the address PADDRP may be a physical address (e.g., a physical page number (PPN), etc.).

FIGS. 10A, 10B, 10C and 10D are diagrams for describing operations of FIGS. 7 and 8 according to example embodiments.

Figure 10A:
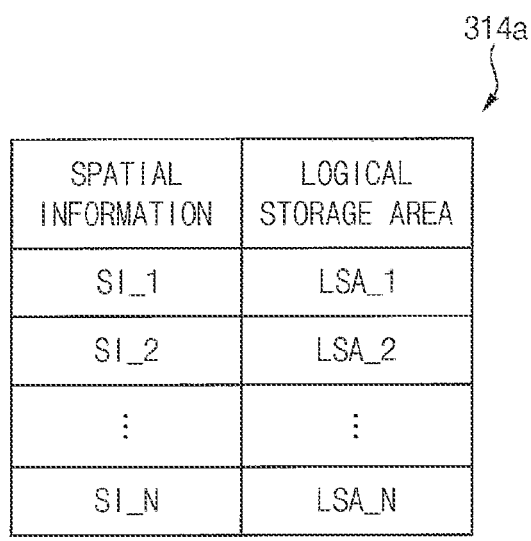
FIGS. 10A, 10B, 10C and 10D are diagrams for describing operations of FIGS. 7 and 8 according to example embodiments.

Referring to FIG. 10A, an example of a spatial information-to-storage location mapping table 314a is illustrated. The spatial information-to-storage location mapping table 314a may include or represent a relationship between spatial information SI_1, SI_2, . . . , SI_N and first to N-th logical storage areas LSA_1, LSA_2, . . . , LSA_N.

In some example embodiments, when the spatial sensor 340 includes a gyroscope sensor and when the spatial information SINF is azimuth information, each of the spatial information SI_1 to SI_N may include azimuth information. For example, each of the spatial information SI_1 to SI_N may represent about 0 degree, about 1 degree, ..., about 359 degrees.

Figure 10B:
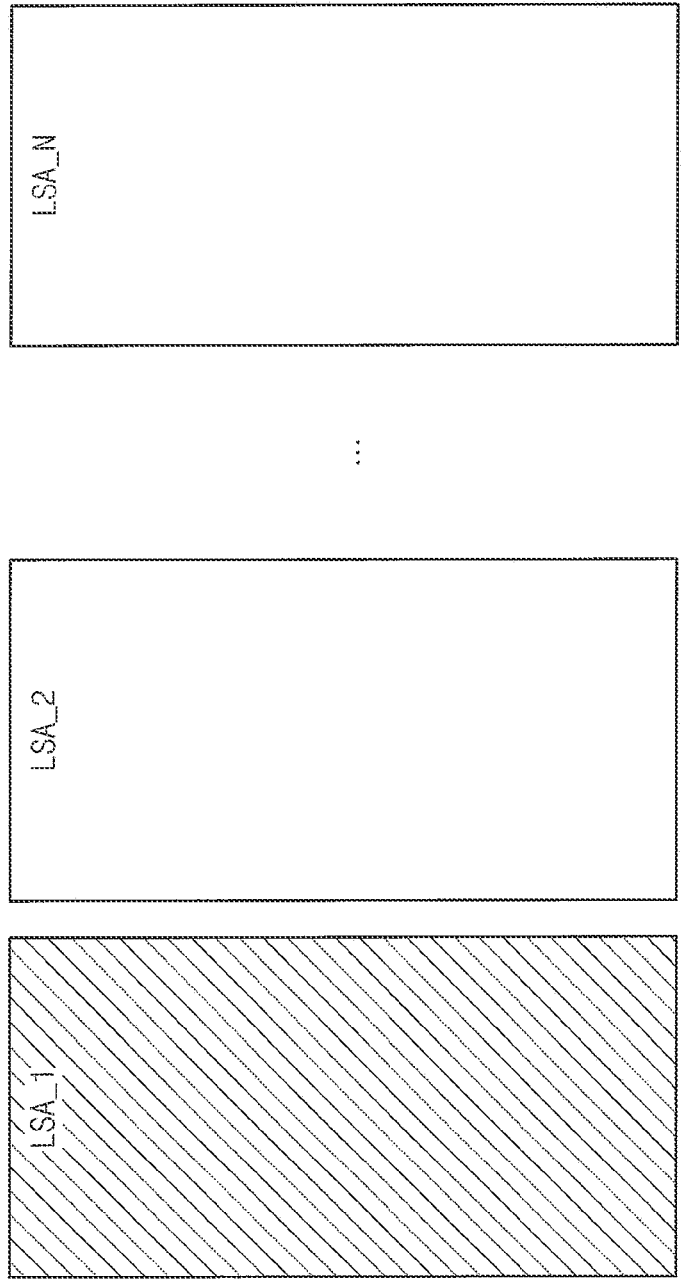

Referring to FIG. 10B, an example of the first to N-th logical storage areas LSA_1 to LSA_N included in the spatial information-to-storage location mapping table 314a of FIG. 10A is illustrated. For example, each of the first to N-th logical storage areas LSA_1 to LSA_N may correspond to one namespace described with reference to FIGS. 5A, 5B, 5C, 6A and 6B. For example, when the spatial information SINF corresponds to about 0 degree, the first logical storage area LSA_1 corresponding to the spatial information SI_1 may be selected and may be set as the target storage area. The target storage area is hatched in FIG. 10B.

Figure 10C:
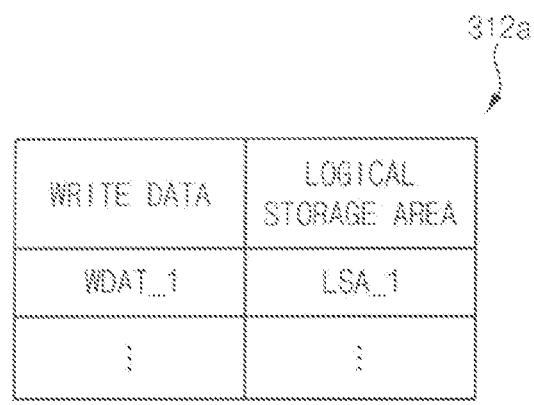

Referring to FIG. 10C, an example of a logical storage area management table 312a is illustrated. The logical storage area management table 312a may be updated such that first write data WDAT_1 corresponding to a first data write request from the host device 200 is mapped to the first logical storage area LSA_1 set as the target storage area.

Figure 10D:
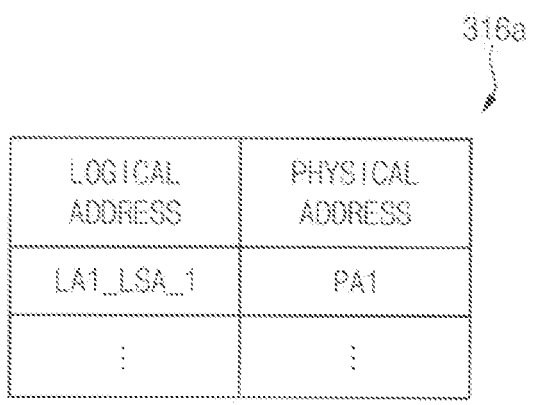

Referring to FIG. 10D, an example of a logical-to-physical address mapping table 316a is illustrated. The logical-to-physical address mapping table 316a may be updated such that a first logical address LA1_LSA_1, which corresponds to the first data write request and corresponds to the first logical storage area LSA_1, is mapped to a first physical address PA1 of the nonvolatile memories 320a to 320c.

In some example embodiments, time information (or temporal information) may be estimated from a plurality of data stored in the same logical storage area. The plurality of data used to estimate the time information may include the target data. For example, a plurality of data including the first write data WDAT_1 written into the first logical storage area LSA_1 may be sequentially written over time, and time points at which data are written may be different even if the data have the same value. Thus, it may be inferred that the plurality of data stored in the same logical storage area may be sequentially written depending on an order of logical addresses. For example, a gyroscope sensor may preserve some past data based on timestamps, and thus, time matching may be performed.

Figure 11:
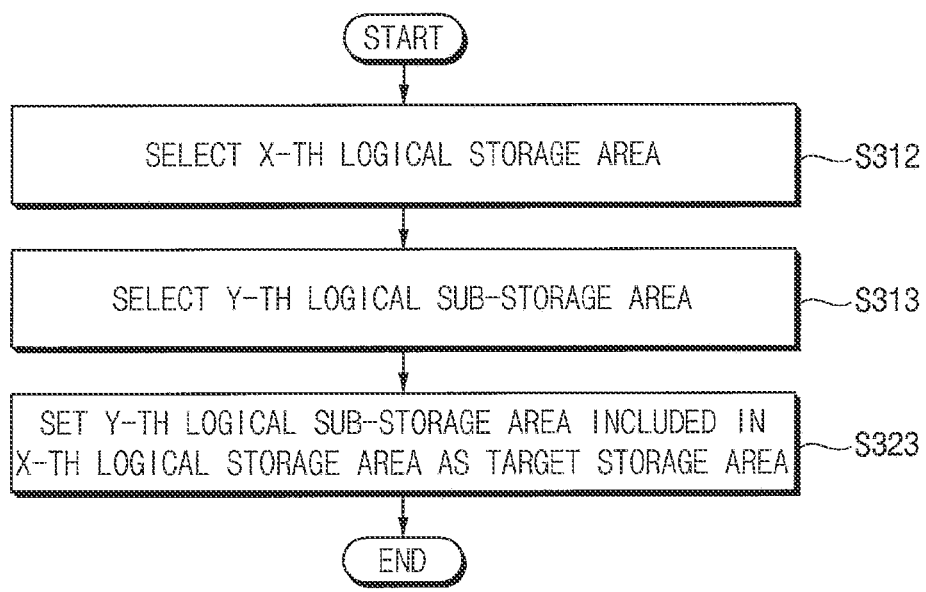
FIG. 11 is a flowchart illustrating an example of selecting a target storage area in FIG. 7 according to example embodiments.

FIG. 11 is a flowchart illustrating an example of selecting a target storage area in FIG. 7 according to example embodiments. For convenience of explanation, a further description of components and technical aspects previously described with reference to FIG. 8 will be omitted.

Referring to FIGS. 7 and 11, when selecting the target storage area (operation S310), each of the first to N-th logical storage areas in FIG. 8 may include first to M-th logical sub-storage areas, where M is a natural number greater than or equal to two. For example, logical storage areas may be set up in a two-level hierarchical structure.

An X-th logical storage area corresponding to the spatial information may be selected from among the first to N-th logical storage areas (operation S312). A Y-th logical sub-storage area corresponding to the spatial information may be selected from among the first to M-th logical sub-storage areas included in the X-th logical storage area (operation S313), where Y is a natural number greater than or equal to one and less than or equal to M. The Y-th logical sub-storage area included in the X-th logical storage area may be set as the target storage area (operation S323).

FIGS. 12A, 12B, 12C and 12D are diagrams for describing operations of FIGS. 7 and 11 according to example embodiments. For convenience of explanation, a further description of components and technical aspects previously described with reference to FIGS. 10A, 10B, 10C and 10D will be omitted.

Referring to FIG. 12A, an example of a spatial information-to-storage location mapping table including a first mapping table 314b1 and a second mapping table 314b2 is illustrated. The first mapping table 314b1 may include a relationship between spatial information SI_A_1, SI_A_2, ..., SI_A_N and first to N-th logical storage areas LSA_A_1, LSA_A_2, ..., LSA_A_N. The second mapping table 314b2 may include a relationship between spatial information SI_B_1, SI_B_2, ..., SI_B_M and first to M-th logical sub-storage areas LSA_B_1, LSA_B_2, ..., LSA_B_M.

In some example embodiments, each of the spatial information SI_A_1 to SI_A_N and SI_B_1 to SI_B_M may include azimuth information. For example, each of the spatial information SI_A_1 to SI_A_N may represent a range or an offset of an azimuth, and each of the spatial information SI_B_1 to SI_B_M may represent a value of an azimuth. For example, the spatial information SI_A_1 may represent a range of about 0 to about 19 degrees or an offset of about 0 degree, the spatial information SI_A_2 may represent a range of about 20 to about 39 degrees or an offset of about 20 degrees, and the spatial information SI_A_N may represent a range of about 340 to about 359 degrees or an offset of about 340 degrees. For example, each of the spatial information SI_B_1 to SI_B_M may represent about 0 degree, about 1 degree, ..., about 19 degrees. In this example, an azimuth may be expressed based on one of the spatial information SI_A_1 to SI_A_N and one of the spatial information SI_B_1 to SI_B_M. For example, an azimuth of about 20+1=21 degrees may be expressed based on the spatial information SI_A_2 and the spatial information SI_B_2.

Referring to FIG. 12B, an example of logical storage areas LSA_1, LSA_2, ..., LSA_N and logical sub-storage areas LSA_1_1, LSA_1_2, ..., LSA_1_M, LSA_2_1, LSA_2_2, ..., LSA_2_M, LSA_N_1, LSA_N_2, ..., LSA_N_M included in the spatial information-to-storage location mapping table of FIG. 12A is illustrated. The logical storage areas LSA_1 to LSA_N in FIG. 12B may correspond to the first to N-th logical storage areas LSA_A_1 to LSA_A_N in FIG. 12A. The logical sub-storage areas LSA_1_1 to LSA_1_M in FIG. 12B may correspond to the first to M-th logical sub-storage areas in FIG. 12A, the logical sub-storage areas LSA_2_1 to LSA_2_M in FIG. 12B may correspond to the first to M-th logical sub-storage areas in FIG. 12A, and the logical sub-storage areas LSA_N_1 to LSA_N_M in FIG. 12B may correspond to the first to M-th logical sub-storage areas in FIG. 12A. For example, each of the logical sub-storage areas LSA_1_1 to LSA_1_M, LSA_2_1 to LSA_2_M and LSA_N_1 to LSA_N_M may correspond to one zone described with reference to FIG. 5C. For example, when the spatial information SINF corresponds to about 21 degrees, the second logical storage area LSA_2 and the second logical sub-storage area LSA_2_2, which correspond to the spatial information SI_A_2 and the spatial information SI_B_2, respectively, may be selected and set as the target storage area.

Figure 12C:
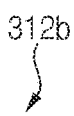

Referring to FIG. 12C, an example of a logical storage area management table 312b is illustrated. The logical storage area management table 312b may be updated such that second write data WDAT_2 corresponding to a second data write request from the host device 200 is mapped to the second logical storage area LSA_2 and the second logical sub-storage area LSA_2_2 set as the target storage area.

Figure 12D:

Referring to FIG. 12D, an example of a logical-to-physical address mapping table 316b is illustrated. The logical-to-physical address mapping table 316b may be updated such that a second logical address LA2_LSA_2_2, which corresponds to the second data write request and corresponds to the second logical storage area LSA_2 and the second logical sub storage area LSA_2_2, is mapped to a second physical address PA2 of the nonvolatile memories 320a to 320c.

Figure 13:
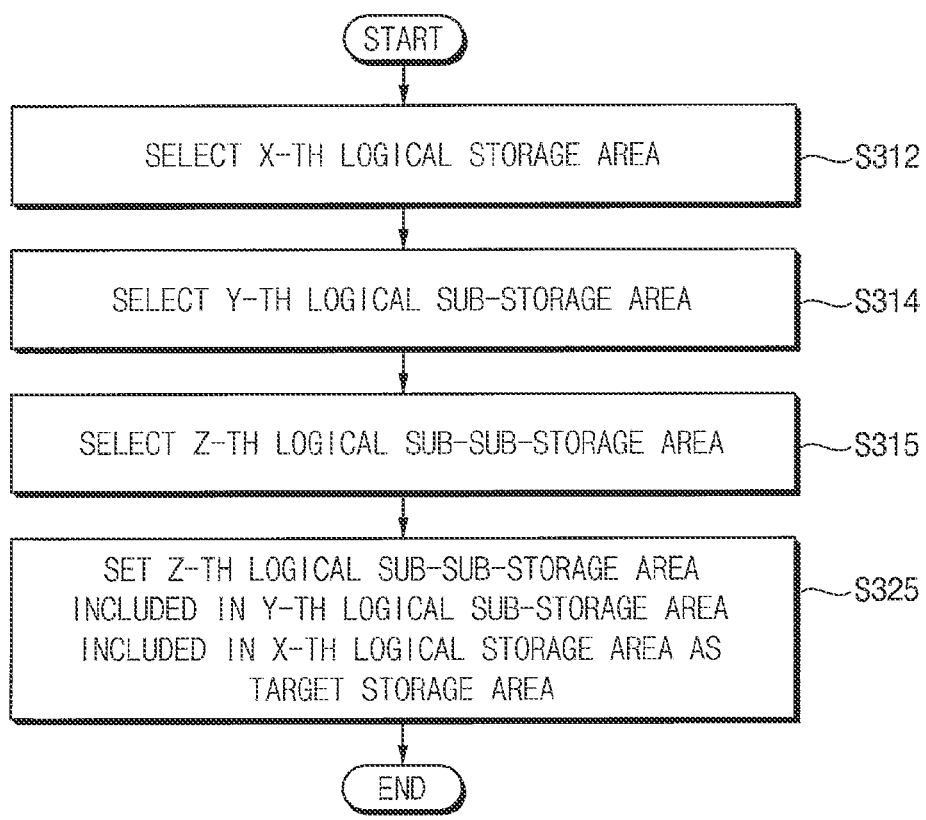
FIG. 13 is a flowchart illustrating an example of selecting a target storage area in FIG. 7 according to example embodiments.

FIG. 13 is a flowchart illustrating an example of selecting a target storage area in FIG. 7 according to example embodiments. For convenience of explanation, a further description of components and technical aspects previously described with reference to FIGS. 8 and 11 will be omitted.

Referring to FIGS. 7 and 13, when selecting the target storage area (operation S310), each of the first to M-th logical sub-storage areas in FIG. 11 may include first to K-th logical sub-sub-storage areas, where K is a natural number greater than or equal to two. For example, logical storage areas may be set up in a three-level hierarchical structure.

An X-th logical storage area corresponding to the spatial information may be selected from among the first to N-th logical storage areas (operation S312). A Y-th logical sub-storage area corresponding to the spatial information may be selected from among the first to M-th logical sub-storage areas included in the X-th logical storage area (operation S314). A Z-th logical sub-sub-storage area corresponding to the spatial information may be selected from among the first to K-th logical sub-sub-storage areas included in the Y-th logical sub-storage area (operation S315), where Z is a natural number greater than or equal to one and less than or equal to K. The Z-th logical sub-sub-storage area included in the Y-th logical sub-storage area included in the X-th logical storage area may be set as the target storage area (operation S325).

FIGS. 14A, 14B, 14C and 14D are diagrams for describing operations of FIGS. 7 and 13 according to example embodiments. For convenience of explanation, a further description of components and technical aspects previously described with reference to FIGS. 10A, 10B, 10C, 10D, 12A, 12B, 12C and 12D will be omitted.

Figure 14A:
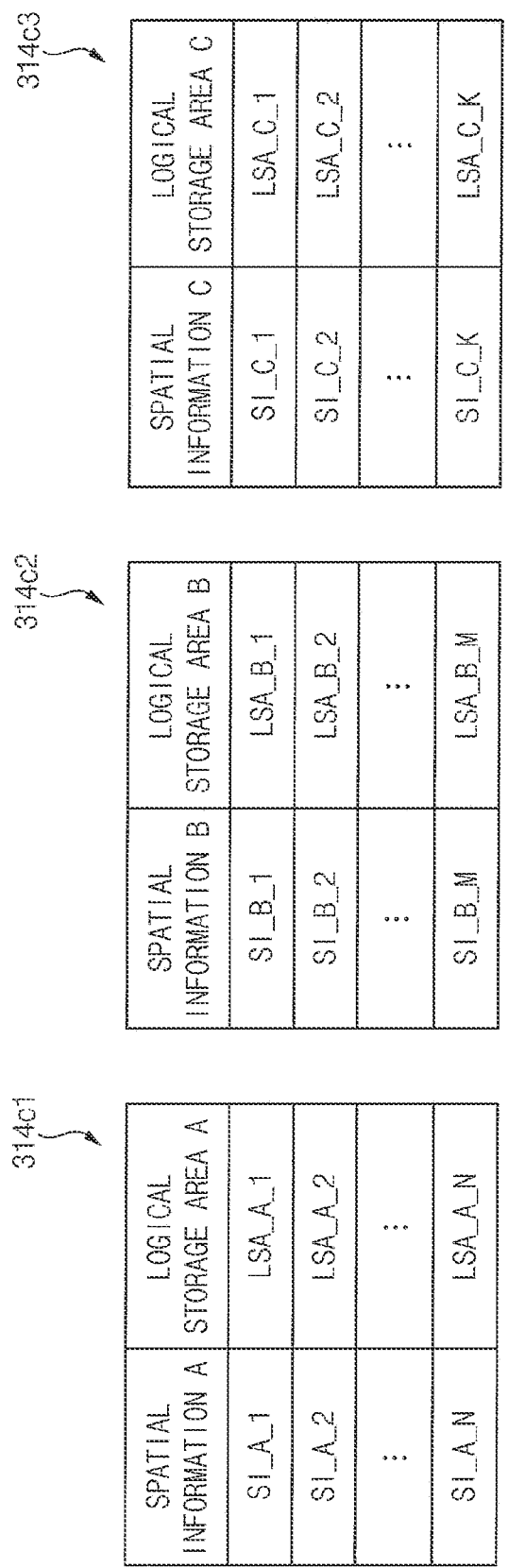
FIGS. 14A, 14B, 14C and 14D are diagrams for describing operations of FIGS. 7 and 13 according to example embodiments.

Referring to FIG. 14A, an example of a spatial information-to-storage location mapping table including a first mapping table 314c1, a second mapping table 314c2 and a third mapping table 314c3 is illustrated. The first and second mapping tables 314c1 and 314c2 in FIG. 14A may be similar to the first and second mapping tables 314b1 and 314b2 in FIG. 12A, respectively. The third mapping table 314c3 may include a relationship between spatial information SI_C_1, SI_C_2, . . . , SI_C_K and first to K-th logical sub-sub-storage areas LSA_C_1, LSA_C_2, . . . , LSA_C_K.

In some example embodiments, each of the spatial information SI_A_1 to SI_A_N, SI_B_1 to SI_B_M and SI_C_1 to SI_C_K may include azimuth information. For example, each of the spatial information SI_A_1 to SI_A_N and SI_B_1 to SI_B_M may represent a range or an offset of an azimuth, and each of the spatial information SI_C_1 to SI_C_K may represent a value of an azimuth. For example, the spatial information SI_A_1 may represent a range of about 0 to about 39 degrees or an offset of about 0 degree, the spatial information SI_A_2 may represent a range of about 40 to about 79 degrees or an offset of about 40 degrees, and the spatial information SI_A_N may represent a range of about 320 to about 359 degrees or an offset of about 320 degrees. For example, the spatial information SI_B_1 may represent a range of about 0 to about 4 degrees or an offset of about 0 degree, the spatial information SI_B_2 may represent a range of about 5 to about 9 degrees or an offset of about 5 degrees, and the spatial information SI_B_M may represent a range of about 35 to about 39 degrees or an offset of about 35 degrees. For example, each of the spatial information SI_C_1 to SI_C_K may represent about 0 degree, about 1 degree, . . . , about 4 degrees. In this example, an azimuth may be expressed based on one of the spatial information SI_A_1 to SI_A_N, one of the spatial information SI_B_1 to SI_B_M, and one of the spatial information SI_C_1 to SI_C_K. For example, an azimuth of about 320+0+4=324 degrees may be expressed based on the spatial information SI_A_N, the spatial information SI_B_1 and the spatial information SI_C_K.

Figure 14B:
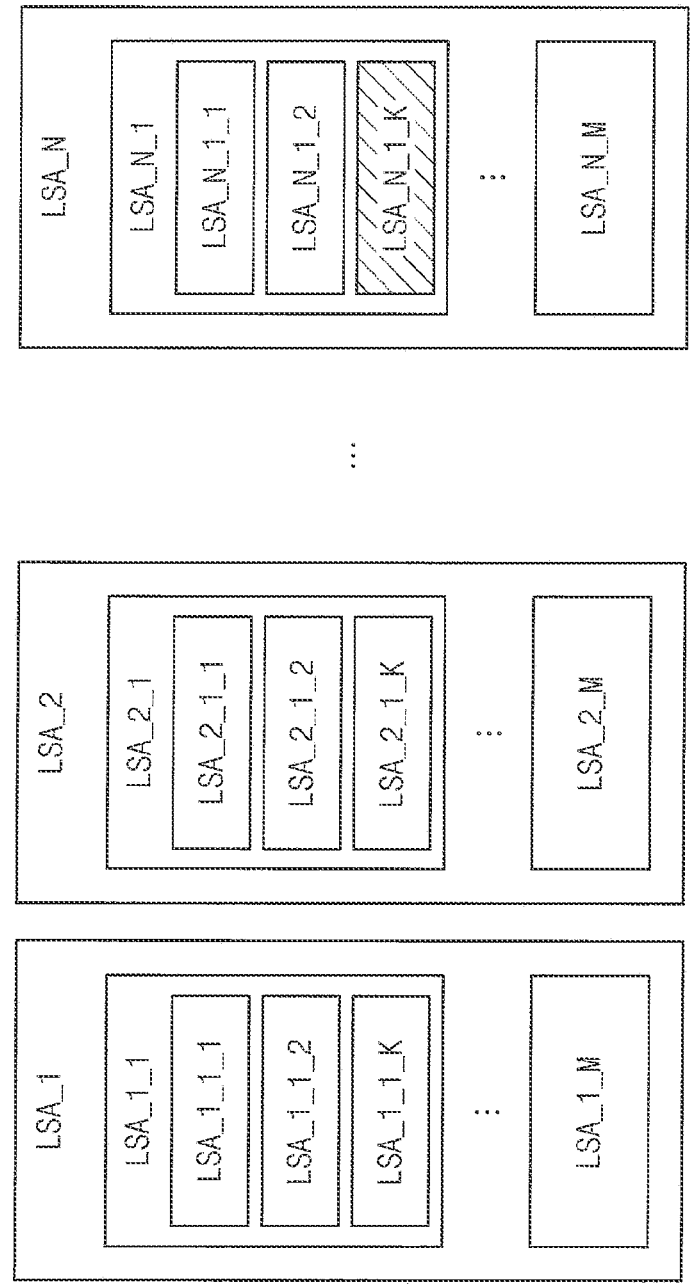

Referring to FIG. 14B, an example of logical storage areas LSA_1, LSA_2, . . . . LSA_N, logical sub-storage areas LSA_1_1, . . . , LSA_1_M, LSA_2_1, . . . , LSA_2_M, LSA_N_1, . . . , LSA_N_M, and logical sub-sub-storage areas LSA_1_1_1, LSA_1_1_2, . . . , LSA_1_1_K, LSA_2_1_1, LSA_2_1_2, . . . , LSA_2_1_K, LSA_N_1_1, LSA_N_1_2, . . . , LSA_N_1_K included in the spatial information-to-storage location mapping table of FIG. 14A is illustrated. The logical sub-sub-storage areas LSA_1_1_1 to LSA_1_1_K in FIG. 14B may correspond to the first to K-th logical sub-sub-storage areas LSA_C_1 to LSA_C_K in FIG. 14A, the logical sub-sub-storage areas LSA_2_1_1 to LSA_2_1_K in FIG. 14B may correspond to the first to K-th logical sub-sub-storage areas LSA_C_1 to LSA_C_K in FIG. 14A, and the logical sub-sub-storage areas LSA_N_1_1 to LSA_N_1_K in FIG. 14B may correspond to the first to K-th logical sub-sub-storage areas LSA_C_1 to LSA_C_K in FIG. 14A. According to example embodiments, each of the logical sub-storage areas LSA_1_M, LSA_2_M and LSA_N_M may also include K logical sub-sub-storage areas. For example, when the spatial information SINF corresponds to about 324 degrees, the N-th logical storage area LSA_N, the first logical sub-storage area LSA_N_1 and the K-th logical sub-sub-storage area LSA_N_1_K, which correspond to the spatial information SI_A_N, the spatial information SI_B_1 and the spatial information SI_C_K, respectively, may be selected and set as the target storage area.

Figure 14C:

Referring to FIG. 14C, an example of a logical storage area management table 312c is illustrated. The logical storage area management table 312c may be updated such that third write data WDAT_3 corresponding to a third data write request from the host device 200 is mapped to the N-th logical storage area LSA_N, the first logical sub-storage area LSA_N_1 and the K-th logical sub-sub-storage area LSA_N_1_K set as the target storage area.

Figure 14D:

Referring to FIG. 14D, an example of a logical-to-physical address mapping table 316c is illustrated. The logical-to-physical address mapping table 316c may be updated such that a third logical address LA3_LSA_N_1_K, which corresponds to the third data write request and corresponds to the N-th logical storage area LSA_N, the first logical sub-storage area LSA_N_1 and the K-th logical sub-sub-storage area LSA_N_1_K, is mapped to a third physical address PA3 of the nonvolatile memories 320a to 320c.

Although example embodiments are described based on examples where the logical storage areas have the one-level, two-level and three-level hierarchical structures, example embodiments are not limited thereto. For example, the logical storage areas may be set up in a J-level hierarchical structure, where J is a natural number greater than three. In addition, although example embodiments are described based on the gyroscope sensor and the azimuth, example embodiments are not limited thereto. For example, when the spatial sensor includes an altitude sensor, the spatial information may correspond to a range or an offset of an altitude, and a value or an altitude.

Figure 15:
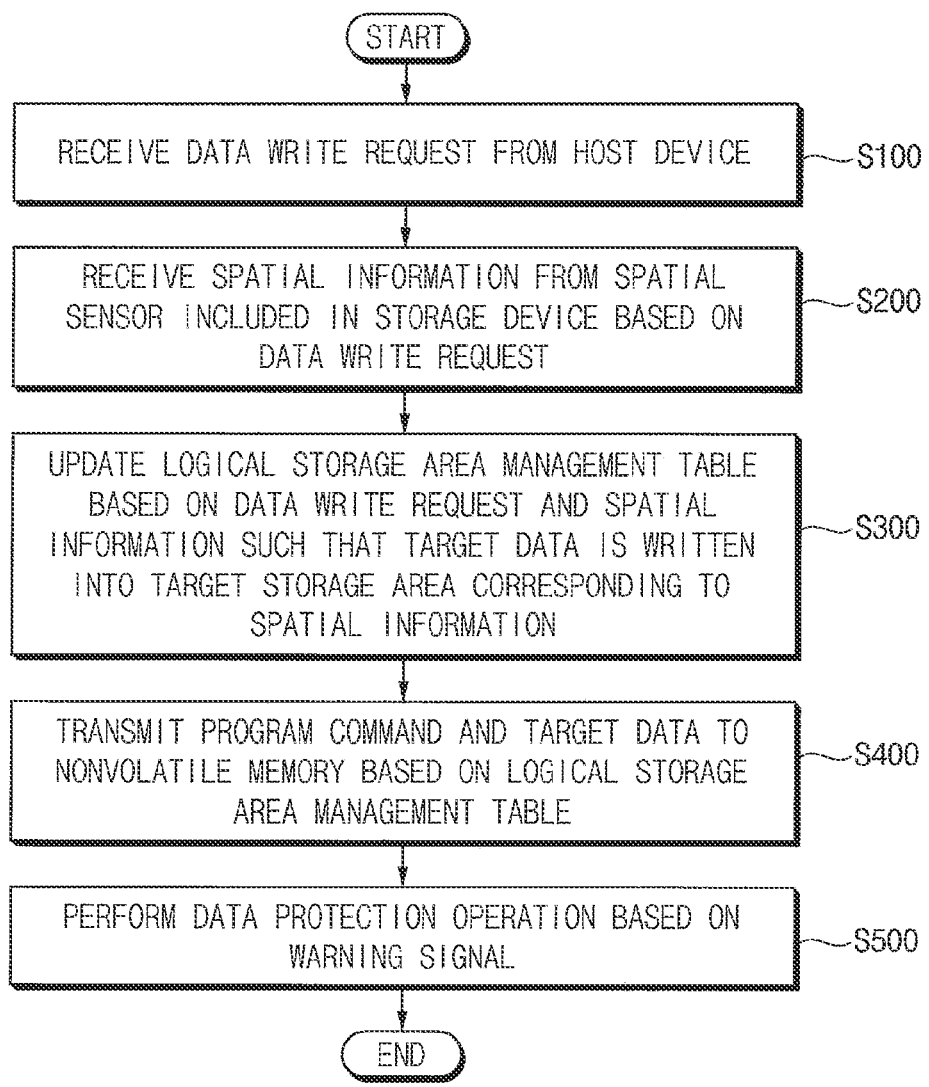
FIG. 15 is a flowchart illustrating a method of writing data in a storage device according to example embodiments.

FIG. 15 is a flowchart illustrating a method of writing data in a storage device according to example embodiments. For convenience of explanation, a further description of components and technical aspects previously described with reference to FIG. 1 will be omitted.

Referring to FIG. 15, in a method of writing data in a storage device according to example embodiments, operations S100, S200, S300 and S400 in FIG. 15 may be substantially the same as operations S100, S200, S300 and S400 in FIG. 1, respectively. Thus, for convenience of explanation, a further description thereof will be omitted.

When a warning signal is received from the spatial sensor, a data protection operation is performed based on the warning signal (operation S500). An example of operation S500 will be described with reference to FIG. 16. In some example embodiments, operation S500 may be performed by the storage controller.

Figure 16:
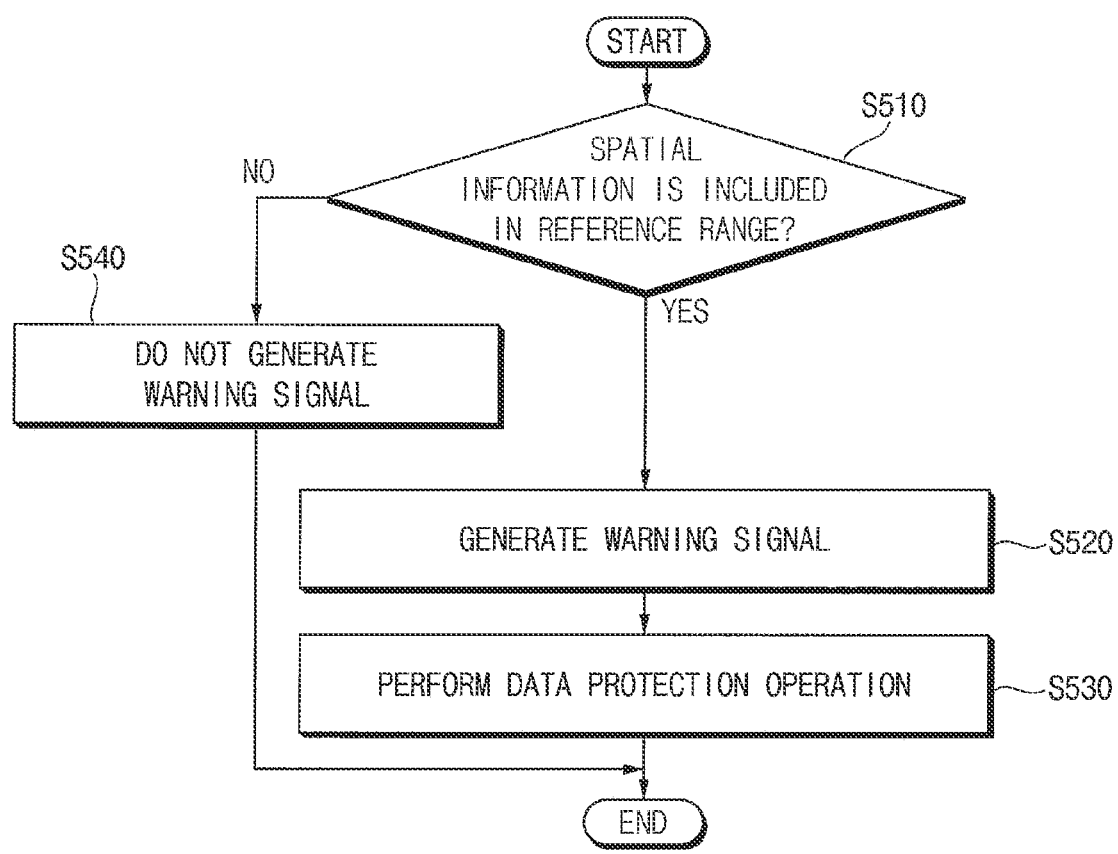
FIG. 16 is a flowchart illustrating an example of performing a data protection operation in FIG. 15 according to example embodiments.

FIG. 16 is a flowchart illustrating an example of performing a data protection operation in FIG. 15 according to example embodiments.

Referring to FIGS. 15 and 16, when performing the data protection operation (operation S500), when the spatial information is included in a predetermined reference range (operation S510: YES), the spatial sensor may generate the warning signal (operation S520), the spatial sensor may transmit the warning signal to the storage controller, and the storage controller may perform the data protection operation (operation S530).

In some example embodiments, the spatial sensor may include an altitude sensor, and the spatial sensor may generate the warning signal when a current altitude measured by the altitude sensor is higher than a reference altitude. However, example embodiments are not limited thereto. For example, the spatial sensor may include a gyroscope sensor, and the spatial sensor may generate the warning signal when a current azimuth measured by the gyroscope sensor within a reference azimuth range according to example embodiments.

In some example embodiments, the data protection operation may include an operation of changing or resetting the logical storage areas. For example, when specific spatial information is included in the reference range, there may be a relatively high probability that a specific logical storage area corresponding to the specific spatial information will be full because a relatively large number of data write operations are performed on the specific logical storage area. Thus, it may be detected that the corresponding logical storage area is full, or another logical storage area may be additionally allocated to the corresponding spatial information.

In some example embodiments, the data protection operation may include an operation of preventing occurrence of data errors and/or data loss. For example, when spatial information exceeds a specific altitude threshold, silent errors may occur due to cosmic rays, and thus, an operation for preventing the silent errors may be performed. For example, data recovery and/or rewrite operations (e.g., reprogramming, defense code, reclaim, etc.) may be performed.

According to example embodiments, when the spatial information is not included in the reference range (operation S510: NO), the spatial sensor does not generate the warning signal (operation S540), and the data protection operation is not performed.

Figure 17:
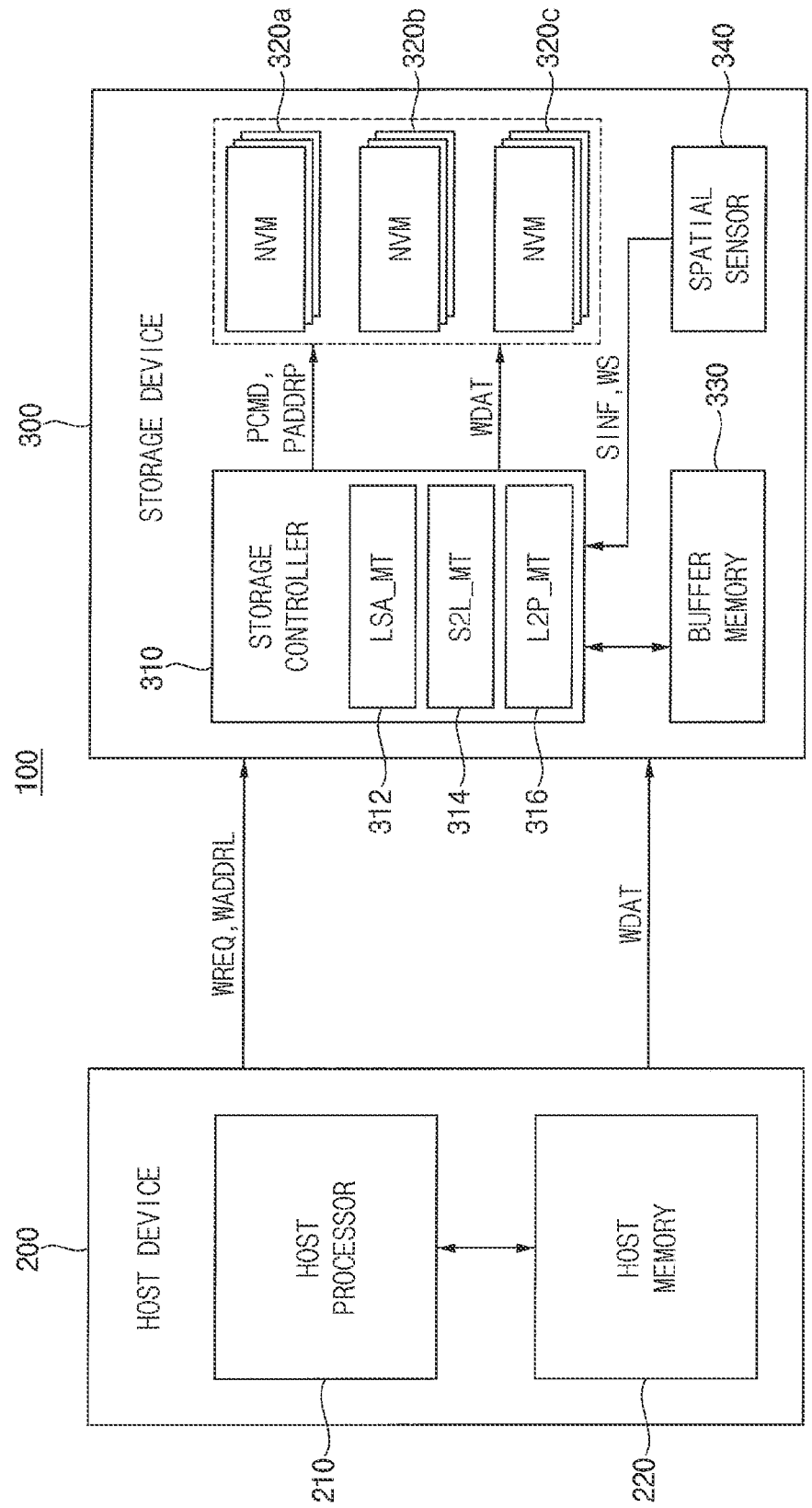
FIG. 17 is a diagram for describing an operation of FIG. 15 according to example embodiments.

FIG. 17 is a diagram for describing an operation of FIG. 15 according to example embodiments. For convenience of explanation, a further description of components and technical aspects previously described with reference to FIG. 9 will be omitted.

Referring to FIGS. 15 and 17, the data write operation may be performed as described with reference to FIG. 9. In addition, when the data write operation is performed, the spatial sensor 340 may generate a warning signal WS when the spatial information SINF is included in the reference range. Based on reception of the warning signal WS, the storage controller 310 may perform the data protection operation.

Figure 18:
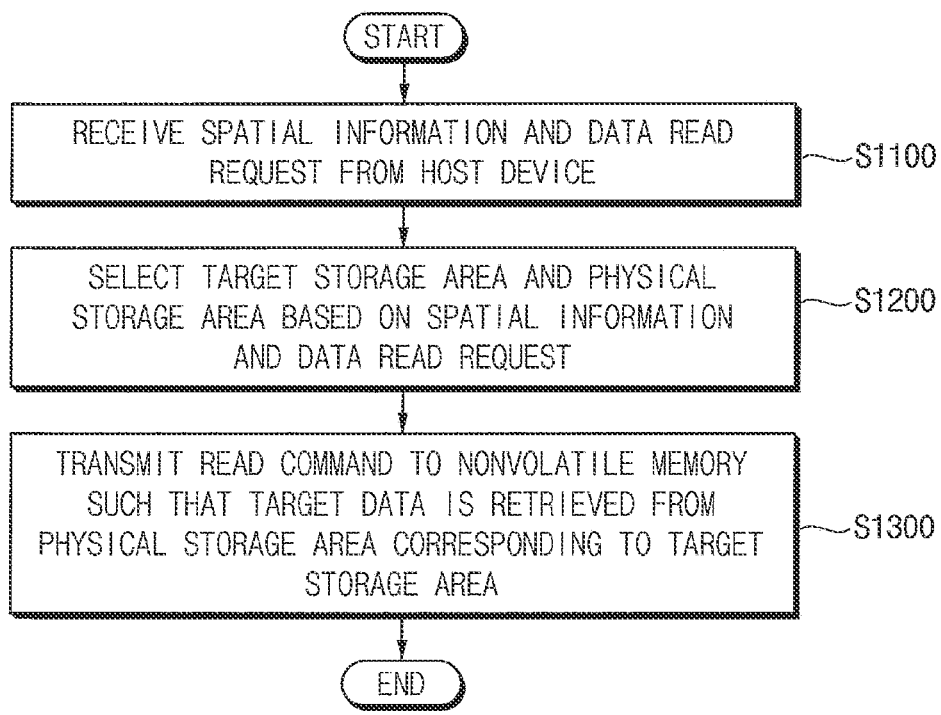
FIG. 18 is a flowchart illustrating a method of reading data from a storage device according to example embodiments.

FIG. 18 is a flowchart illustrating a method of reading data from a storage device according to example embodiments.

Referring to FIG. 18, a method of reading data according to example embodiments is performed by a storage device that includes a storage controller, a nonvolatile memory and a spatial sensor. The storage device may operate based on a request received from a host device. For example, the storage device may be implemented as described with reference to FIG. 2.

In the method of reading data from the storage device according to example embodiments, spatial information and a data read request are received from a host device (operation S1100). For example, a data read operation according to example embodiments may be started based on the data read request received from the host device. The data read request may be referred to as a read host command.

Based on the spatial information and the data read request, a target storage area and a physical storage area are selected (operation S1200). Target data (e.g., read data) to be read and corresponding to the data read request is stored in the target storage area corresponding to the spatial information among a plurality of logical storage areas. The physical storage area in the nonvolatile memory corresponds to the target storage area. For example, a logical location and a physical location corresponding to the spatial information requested by the host device may be determined and designated for the target data. For example, the plurality of logical storage areas may be implemented as described with reference to FIGS. 5A, 5B, 5C, 6A and 6B. An example of operation S1200 will be described with reference to FIG. 19.

Based on a logical storage area management table, a read command is transmitted to the nonvolatile memory such that the target data is retrieved from the physical storage area corresponding to the target storage area (operation S1300). For example, after the logical location and the physical location are determined and designated for the target data, the target data may be actually read. The read command may be referred to as a read memory command.

In some example embodiments, operations S1100, S1200 and S1300 may be performed by the storage controller.

In the method of reading data from the storage device according to example embodiments, the storage device may determine the logical location from which data is to be read using sensor information received from the host device. For example, the target data may be retrieved from the target storage area using the spatial information received from the host device. For example, only data corresponding to specific spatial information may be stored in a specific logical location. Accordingly, data corresponding to specific spatial information may be efficiently collected according to example embodiments, and the storage device may have increased performance and efficiency.

Figure 19:
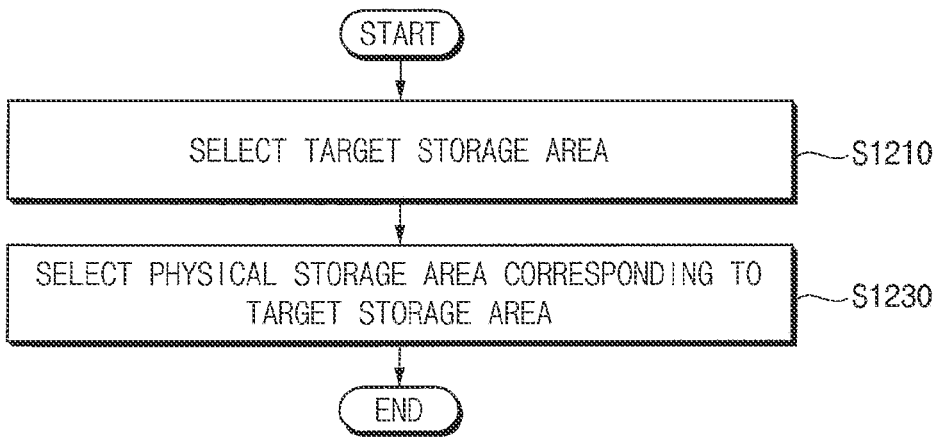
FIG. 19 is a flowchart illustrating an example of selecting a target storage area and a physical storage area in FIG. 18 according to example embodiments.

FIG. 19 is a flowchart illustrating an example of selecting a target storage area and a physical storage area in FIG. 18 according to example embodiments.

Referring to FIGS. 18 and 19, when selecting the target storage area and the physical storage area (operation S1200), the target storage area may be selected from among the plurality of logical storage areas based on the spatial information and a spatial information-to-storage location mapping table (operation S1210). The physical storage area corresponding to the target storage area may be selected based on a logical storage area management table and a logical-to-physical address mapping table.

For example, in an example of FIGS. 12A and 12B, when the spatial information SINF corresponding to about 21 degrees is received from the host device 200, the second logical storage area LSA_2 and the second logical sub-storage area LSA_2_2 may be selected as the target storage area based on the spatial information-to-storage location mapping table of FIG. 12A, and data stored in the second logical storage area LSA_2 and the second logical sub-storage area LSA_2_2 may be retrieved based on the logical storage area management table 312b of FIG. 12C and the logical-to-physical address mapping table 316b of FIG. 12D.

In some example embodiments, as described with reference to FIG. 10, time information may be estimated from a plurality of data stored in the same logical storage area.

Figure 20:
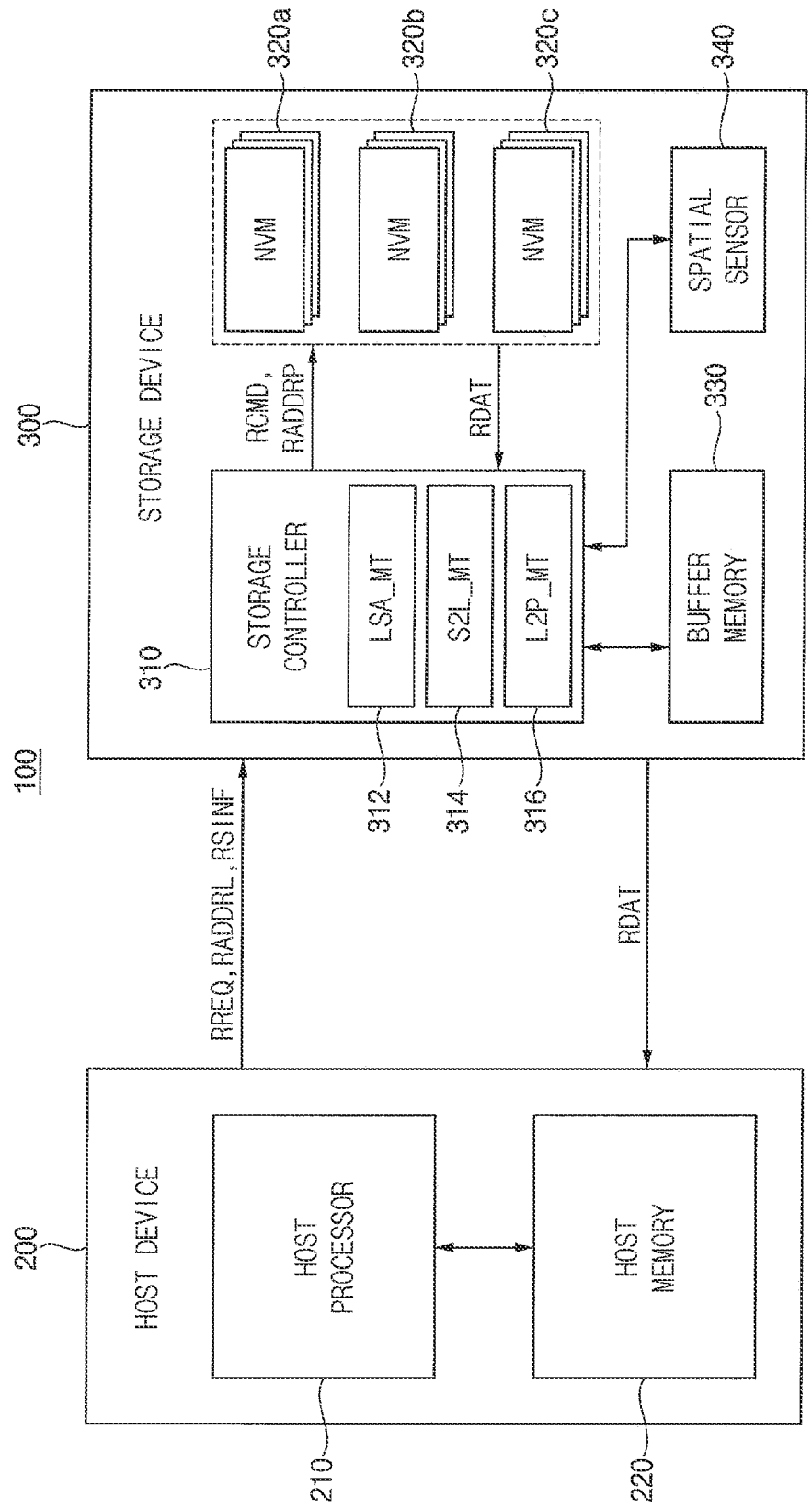
FIG. 20 is a diagram for describing an operation of FIG. 18 according to example embodiments.

FIG. 20 is a diagram for describing an operation of FIG. 18 according to example embodiments.

Referring to FIGS. 18 and 20, when the data read operation is performed, the storage controller 310 may receive a data read request RREQ, an address RADDRL and spatial information RSINF from the host device 200. In some example embodiments, the address RADDRL may be omitted. Using the spatial information-to-storage location mapping table 314, the storage controller 310 may select the target storage area that is a logical storage area in which target data RDAT to be read is stored and corresponds to the spatial information RSINF. Using the logical storage area management table 312 and the logical-to-physical address mapping table 316, the storage controller 310 may select the physical storage area corresponding to the target storage area. The storage controller 310 may transmit a read command RCMD and an address RADDRP to the nonvolatile memories 320a to 320c such that the target data RDAT is retrieved from the physical storage area corresponding to the target storage area. After that, the storage controller 310 may receive the target data RDAT from the nonvolatile memories 320a to 320c and may transmit the target data RDAT to the host device 200.

Figure 21:
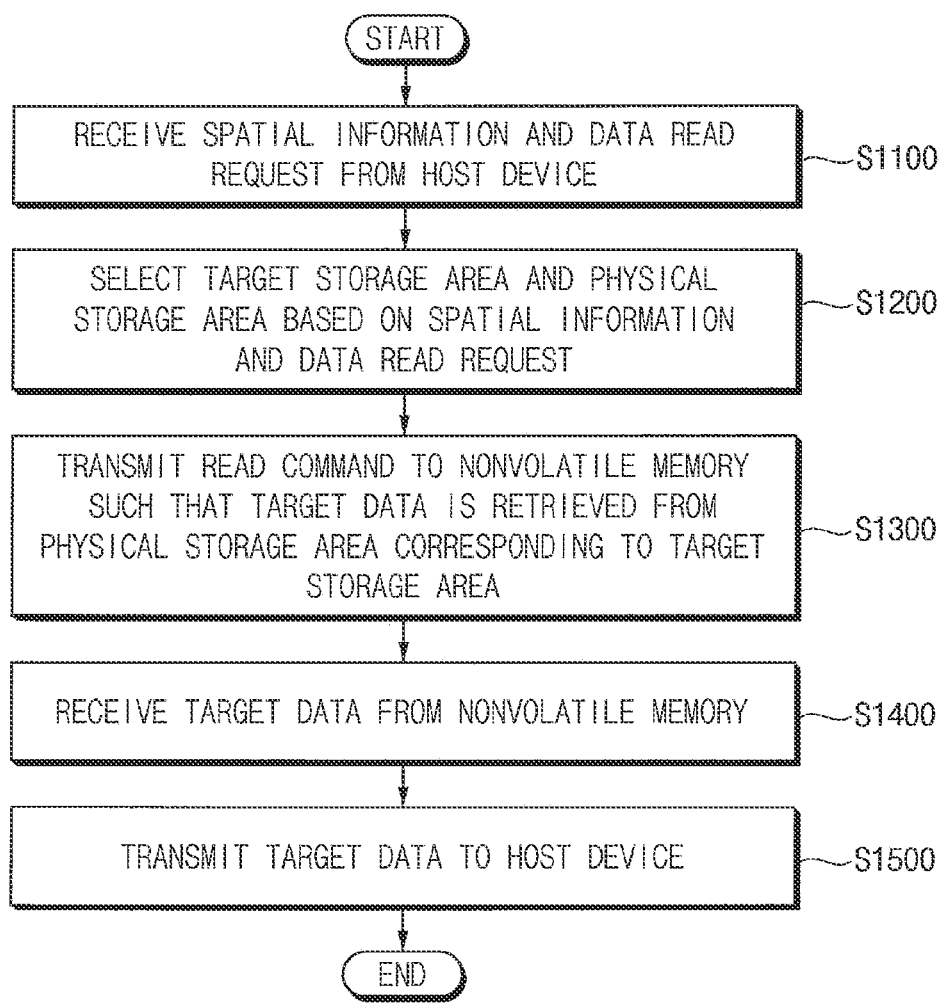
FIGS. 21 and 22 are flowcharts illustrating a method of reading data from a storage device according to example embodiments.
Figure 22:
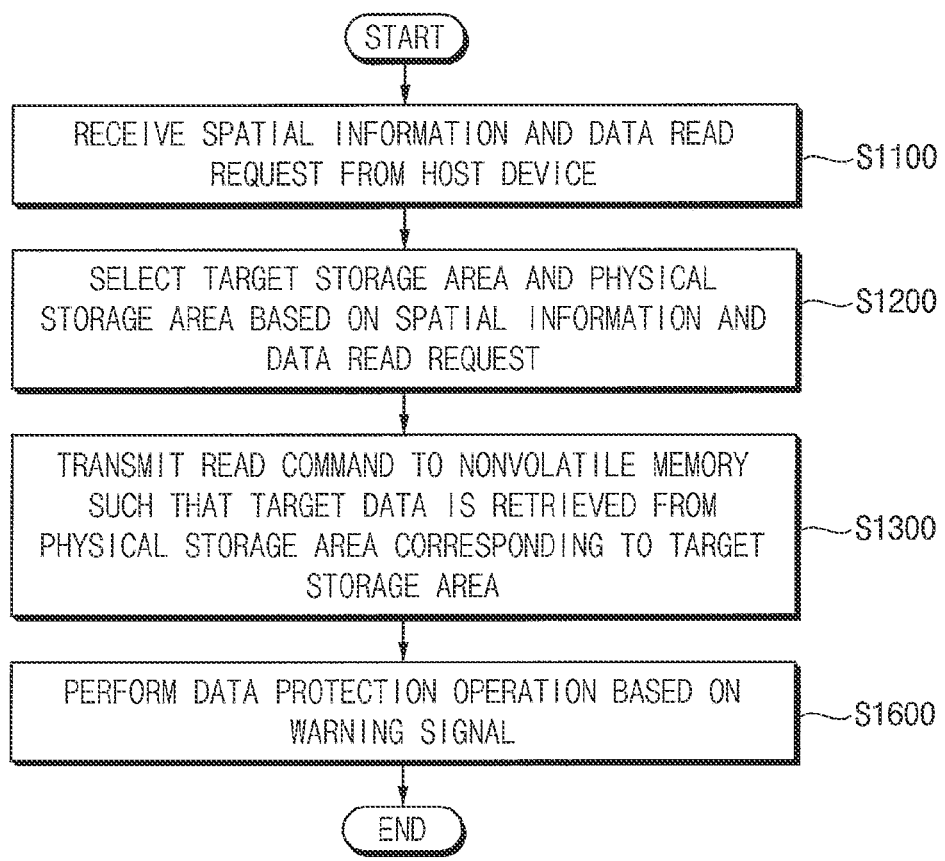

FIGS. 21 and 22 are flowcharts illustrating a method of reading data from a storage device according to example embodiments. For convenience of explanation, a further description of components and technical aspects previously described with reference to FIG. 18 will be omitted.

Referring to FIGS. 21 and 22, in a method of reading data from a storage device according to example embodiments, operations S1100, S1200 and S1300 in FIGS. 21 and 22 may be substantially the same as operations S1100, S1200 and S1300 in FIG. 18, respectively. Thus, for convenience of explanation, a further description thereof will be omitted.

In the method of reading data from the storage device of FIG. 21, the target data is received from the nonvolatile memory (operation S1400), and the target data is transmitted to the host device (operation S1500).

In the method of reading data from the storage device of FIG. 22, when a warning signal is received from the spatial sensor included in the storage device, a data protection operation is performed based on the warning signal (operation S1600). Operation S1600 may be substantially the same as operation S500 in FIG. 15. Thus, for convenience of explanation, a further description thereof will be omitted.

In some example embodiments, all of operations S1400 and S1500 in FIG. 21 and operation S1600 in FIG. 22 may be performed.

Figure 23:
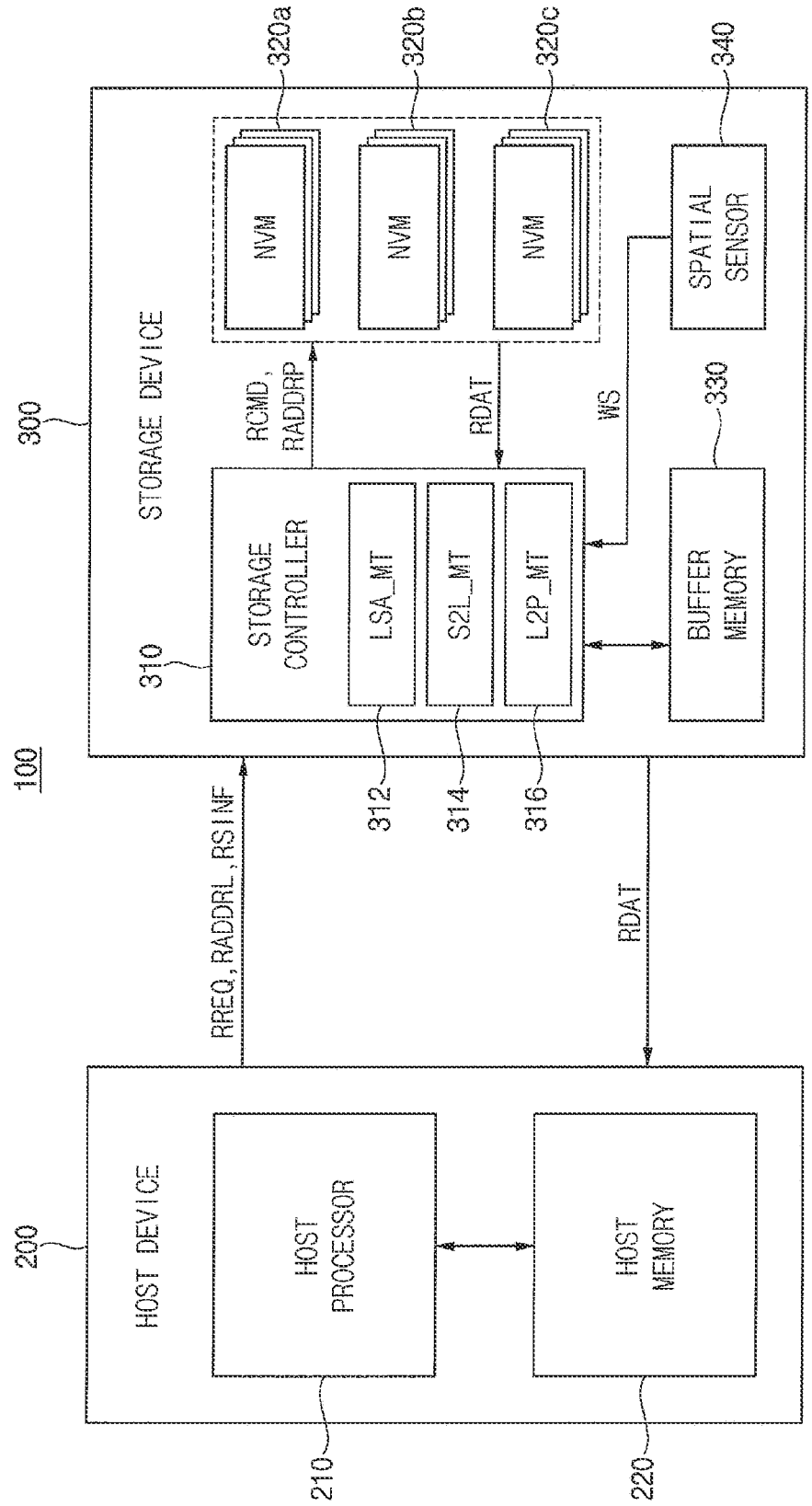
FIG. 23 is a diagram for describing an operation of FIG. 22 according to example embodiments.

FIG. 23 is a diagram for describing an operation of FIG. 22 according to example embodiments. For convenience of explanation, a further description of components and technical aspects previously described with reference to FIGS. 17 and 20 will be omitted.

Referring to FIGS. 22 and 23, the data read operation may be performed as described with reference to FIG. 20. In addition, the data protection operation may be performed similarly to that described with reference to FIG. 17. Thus, for convenience of explanation, a further description thereof will be omitted.

Figure 24:
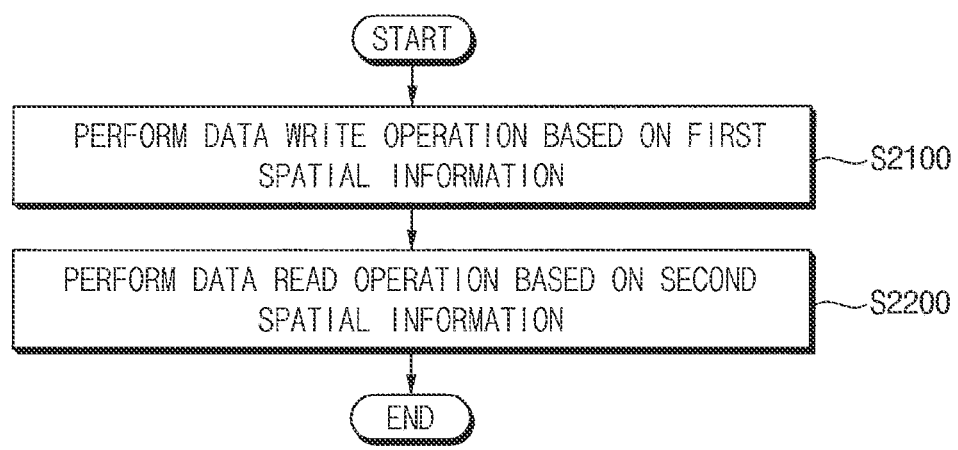
FIG. 24 is a flowchart illustrating a method of operating a storage device according to example embodiments.

FIG. 24 is a flowchart illustrating a method of operating a storage device according to example embodiments.

Referring to FIG. 24, in a method of operating a storage device according to example embodiments, a data writing operation is performed based on first spatial information received from the spatial sensor included in the storage device (operation S2100), and a data read operation is performed based on second spatial information received from the host device (operation S2200). Operation S2100 may be implemented based on the method of writing data according to example embodiments described with reference to FIGS. 1 and 7 through 17. Operation S2200 may be implemented based on the method of reading data according to example embodiments described with reference to FIGS. 18 through 23.

Figure 25:
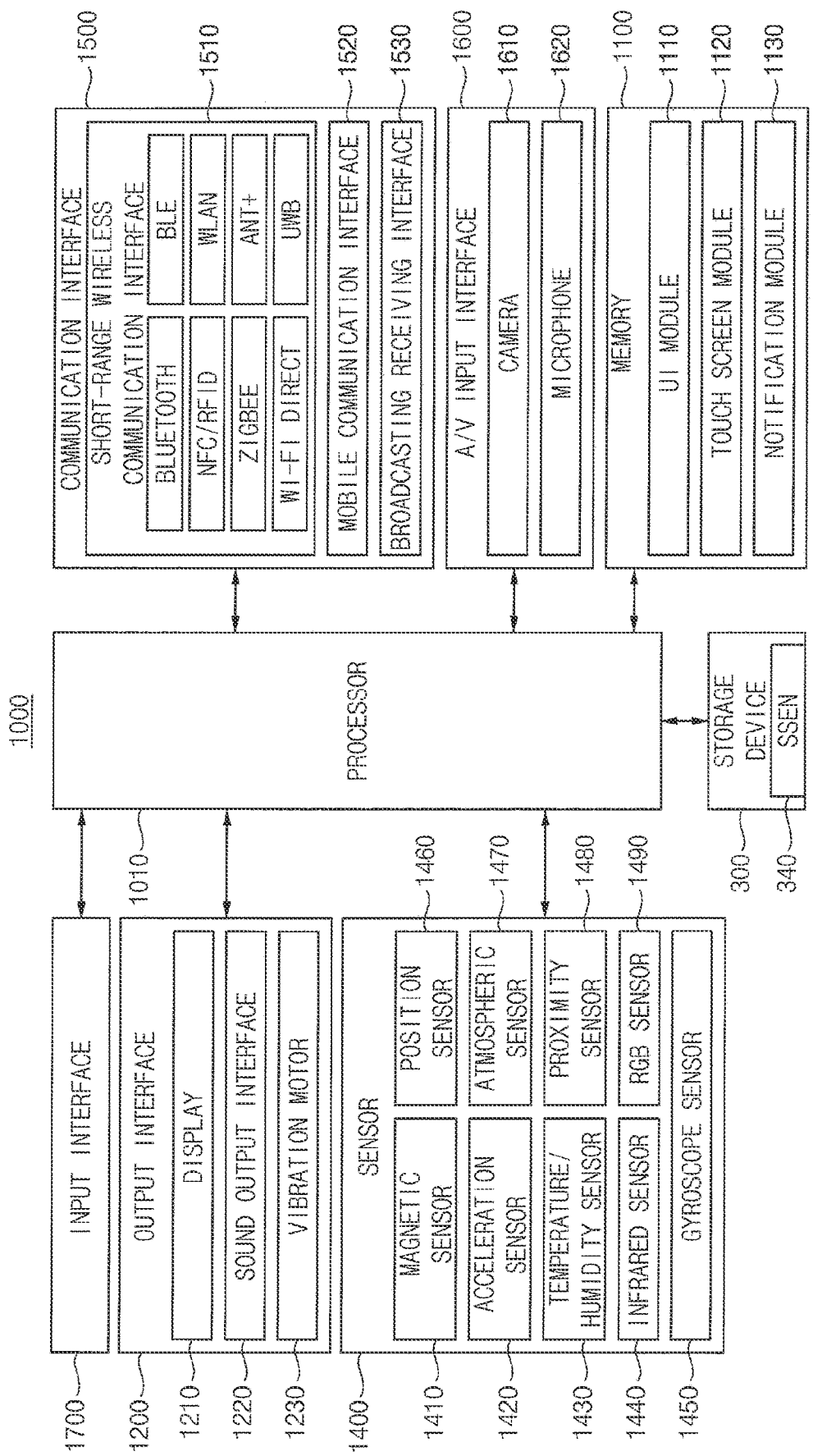
FIG. 25 is a block diagram illustrating an electronic system according to example embodiments.

FIG. 25 is a block diagram illustrating an electronic system according to example embodiments.

Referring to FIG. 25, an electronic system 1000 may include a processor 1010, a storage device 300, a memory 1100, an output interface (e.g., including output circuitry) 1200, a sensor 1400, a communication interface (e.g., including communication circuitry) 1500, an audio/video (A/V) input interface (e.g., including A/V input circuitry) 1600, and an input interface (e.g., including input circuitry) 1700.

The processor 1010 includes various processing circuitry and controls general operations of the electronic system 1000. The storage device 300 may be the storage device according to example embodiments, and may include a spatial sensor (SSEN) 340. The processor 1010 and the storage device 300 may correspond to the host device 200 and the storage device 300 in FIG. 2, respectively.

The input interface 1700 may receive an input for controlling an operation of a module mounted in the electronic system 1000.

The output interface 1200 may include various circuitry to output an audio signal, a video signal, and/or a vibration signal, and may include a display 1210, a sound output interface (e.g., including sound output circuitry) 1220, and a vibration motor 1230. For example, the output interface 1200 may output a notification message as audio, a video, and/or vibration.

The processor 1010 may generally control the input interface 1700, the output interface 1200, the sensor 1400, the communication interface 1500, the A/V input interface 1600, etc., by executing programs stored in the memory 1100. The processor 1010 may perform the functions of the electronic system 1000, by executing the programs stored in the memory 1100.

The sensor 1400 may include various sensors and sensing circuitry to sense a state of the electronic system 1000, a state of a user, or a state around the electronic system 1000, and may transmit sensed information to the processor 1010. The sensor 1400 may include various sensing circuitry, such as, for example, at least one of a magnetic sensor 1410, an acceleration sensor 1420, a temperature/humidity sensor 1430, an infrared sensor 1440, a gyroscope sensor 1450, a position sensor (e.g., global positioning system (GPS)) 1460, an atmospheric sensor 1470, a proximity sensor 1480, and an RGB sensor 1490, but is not limited thereto.

The communication interface 1500 may include various communication circuitry including at least one component configured to enable the electronic system 1000 to communicate with another electronic system and a server. For example, the communication interface 1500 may include a short-range wireless communication interface 1510, a mobile communication interface 1520, and a broadcasting receiving interface 1530. The short-range wireless communication interface 1510 may include a BLUETOOTH communication interface, a BLUETOOTH low energy (BLE) communication interface, a near-field communication and/or radio frequency identification (NFC/RFID) interface, a WLAN (e.g., WI-FI) communication interface, a ZIGBEE communication interface, an infrared data association (IrDA) communication interface, a WI-FI Direct (WFD) communication interface, a ultra wideband (UWB) communication interface, an Ant+ communication interface, etc., but is not limited thereto.

The A/V input interface 1600 may include various A/V interface circuitry and is configured to input an audio signal or a video signal, and may include a camera 1610, a microphone 1620, etc.

The memory 1100 may store programs for the processing and controlling operations of the processor 1010, and may store data that is input to the electronic system 1000 or output from the electronic system 1000. The programs stored in the memory 1100 may be divided into a plurality of modules based on their functions. For example, the programs may be divided into a user interface (UI) module 1110, a touch screen module 1120, and a notification module 1130.

Figure 26:
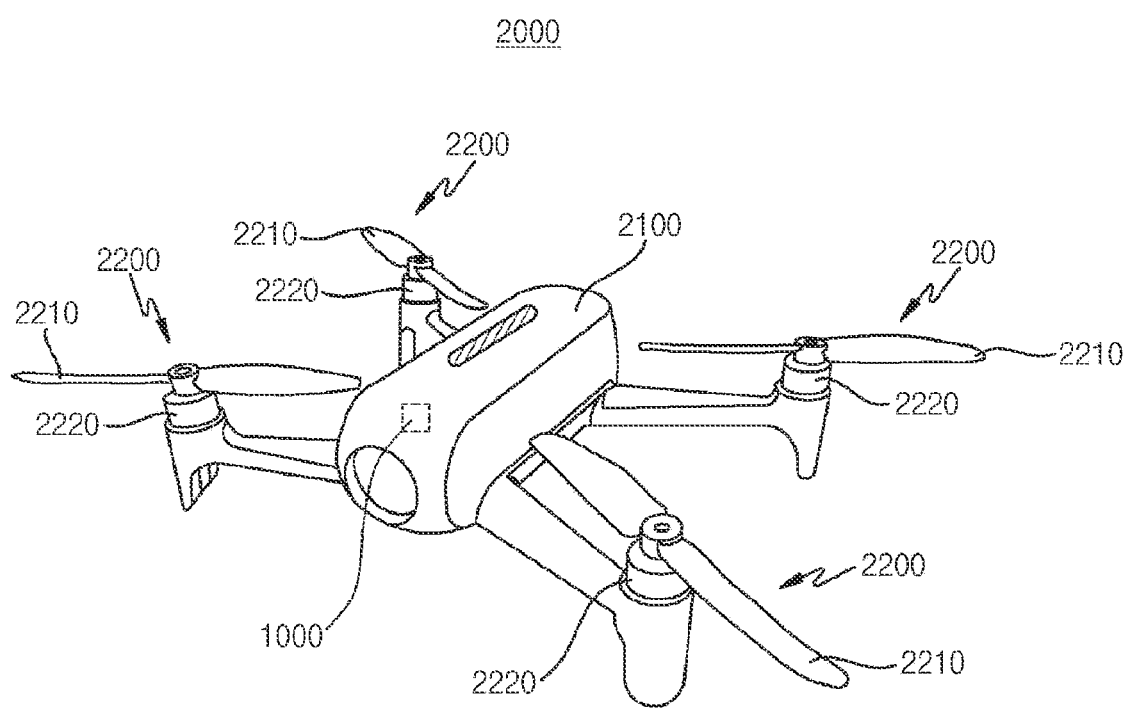
FIGS. 26 and 27 are diagrams illustrating examples where an electronic system according to example embodiments is mounted on an unmanned aerial vehicle and a vehicle.
Figure 27:
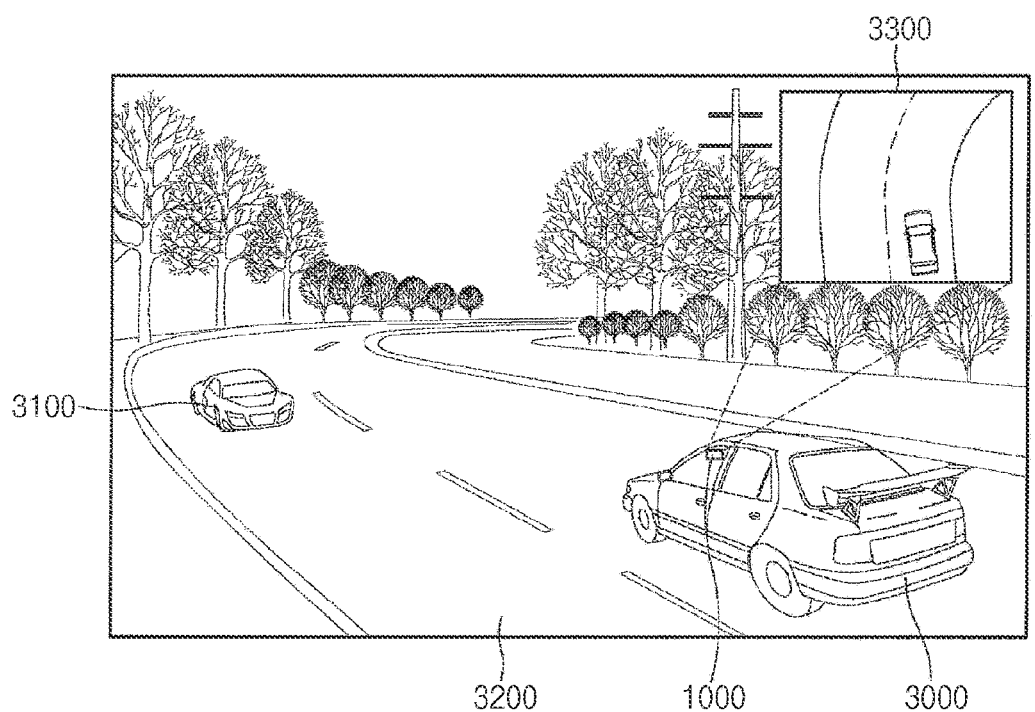

FIGS. 26 and 27 are diagrams illustrating examples where an electronic system according to example embodiments is mounted on an unmanned aerial vehicle and a vehicle.

Referring to FIG. 26, an electronic system 1000 may be an unmanned flight control system, etc., that is included in (e.g., mounted on) an unmanned aerial vehicle (UAV) 2000.

The unmanned aerial vehicle 2000 may include a housing 2100 and a plurality of propulsion elements 2200. The electronic system 1000 may be disposed inside the housing 2100. The plurality of propulsion elements 2200 may provide a thrust to the unmanned aerial vehicle 2000, and may enable the unmanned aerial vehicle 2000 to fly. For example, each of the plurality of propulsion elements 2200 may include a propeller 2210 and a motor 2220 configured to rotate the propeller 2210.

Referring to FIG. 27, an electronic system 1000 may be an advanced driver assistance system (ADAS), an autonomous driving system, etc., that is included in (e.g., mounted on) a vehicle 2000.

The electronic system 1000 may include various instances of circuitry and components configured to receive a video sequence including a stereo image, reflected waves (e.g., reflected electromagnetic waves), or reflected lights from a camera mounted in the vehicle 2000, and may determine the occurrence of various events associated with the vehicle 2000. The various events may include, for example, object detection, object tracking and scene segmentation. The electronic system 1000 may generate an output signal that includes a notification message that may be presented to an occupant (e.g., user) of the vehicle 2000, via one or more user interfaces of the vehicle 2000, based on a determined occurrence of one or more events. The electronic system 1000 may generate an output signal that causes a vehicle control system of the vehicle 2000 to control one or more driving elements of the vehicle 2000 to control the driving (e.g., driving trajectory) of the vehicle 2000, based on a determined occurrence of one or more events.

For example, the electronic system 1000 may detect a road 3200 including a fixed pattern and another vehicle 3100 moving according to time, by analyzing the at least one video sequence 3300. For example, the electronic system 1000 may determine occurrence of an event based on detection of the other vehicle 3100, by analyzing a location of the other vehicle 3100 by analyzing a coordinate of the other vehicle 3100 in the at least one video sequence 3300. The electronic system 1000 may further, based on the determination, generate an output signal that, when processed by a control system of the vehicle 2000, causes a particular notification message to be presented to an occupant of the vehicle 2000 via a user interface of the vehicle 2000 and/or causes driving of the vehicle 2000 to be controlled to cause the vehicle 2000 to be driven along a particular driving path (e.g., driving trajectory) through the surrounding environment (e.g., autonomous driving, driving the vehicle 2000 as an autonomous vehicle, etc.).

In some example embodiments, the vehicle 2000 may include any means of transportation, such as, for example, an automobile, a bus, a truck, a train, a bicycle, a motorcycle, etc., providing a communication function, a data processing function, and/or a transportation function.

Embodiments of the present disclosure may be applied to various electronic devices and systems that include the storage devices and the storage systems. For example, embodiments of the present disclosure may be applied to systems such as a personal computer (PC), a server computer, a data center, a workstation, a mobile phone, a smartphone, a tablet computer, a laptop computer, a personal digital assistant (PDA), a portable multimedia player (PMP), a digital camera, a portable game console, a music player, a camcorder, a video player, a navigation device, a wearable device, an Internet of Things (IoT) device, an Internet of Everything (IoE) device, an e-book reader, a virtual reality (VR) device, an augmented reality (AR) device, a robotic device, a drone, an automotive device, etc.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the present disclosure has been particularly shown and described with reference to example embodiments thereof, it will be understood by those of ordinary skill in the art that various changes in form and detail may be made therein without departing from the spirit and scope of the present disclosure as defined by the following claims.

What is claimed is:

1. A method of writing data in a storage device, the method comprising:
    receiving a data write request from a host device;
    receiving spatial information from a spatial sensor included in the storage device based on the data write request;
    updating a logical storage area management table based on the data write request and the spatial information such that a target data to be stored is written into a target storage area corresponding to the spatial information among a plurality of logical storage areas,
    wherein the spatial information is not written into the target storage area with the target data; and
    transmitting a program command and the target data to a nonvolatile memory such that the target data is programmed into a physical storage area in the nonvolatile memory corresponding to the target storage area.

2. The method of claim 1, wherein updating the logical storage area management table comprises:
    selecting the target storage area from among the plurality of logical storage areas based on the spatial information and a spatial information-to-storage location mapping table; and
    mapping the target data to the target storage area in the logical storage area management table.

3. The method of claim 2, wherein the plurality of logical storage areas comprise first to N-th logical storage areas, where N is a natural number greater than or equal to two.

4. The method of claim 3, wherein selecting the target storage area comprises:
    selecting an X-th logical storage area corresponding to the spatial information from among the first to N-th logical storage areas, where X is a natural number greater than or equal to one and less than or equal to N; and
    setting the X-th logical storage area as the target storage area.

5. The method of claim 3, wherein each of the first to N-th logical storage areas includes first to M-th logical sub-storage areas, where M is a natural number greater than or equal to two.

6. The method of claim 5, wherein selecting the target storage area comprises:
    selecting an X-th logical storage area corresponding to the spatial information from among the first to N-th logical storage areas, where X is a natural number greater than or equal to one and less than or equal to N;
    selecting a Y-th logical sub-storage area corresponding to the spatial information from among the first to M-th logical sub-storage areas included in the X-th logical storage area, where Y is a natural number greater than or equal to one and less than or equal to M; and
    setting the Y-th logical sub-storage area included in the X-th logical storage area as the target storage area.

7. The method of claim 5, wherein each of the first to M-th logical sub-storage areas comprises first to K-th logical sub-sub-storage areas, where K is a natural number greater than or equal to two.

8. The method of claim 7, wherein selecting the target storage area comprises:
    selecting an X-th logical storage area corresponding to the spatial information from among the first to N-th logical storage areas, where X is a natural number greater than or equal to one and less than or equal to N;
    selecting a Y-th logical sub-storage area corresponding to the spatial information from among the first to M-th logical sub-storage areas included in the X-th logical storage area, where Y is a natural number greater than or equal to one and less than or equal to M;
    selecting a Z-th logical sub-sub-storage area corresponding to the spatial information from among the first to K-th logical sub-sub-storage areas included in the Y-th logical sub-storage area, where Z is a natural number greater than or equal to one and less than or equal to K; and
    setting the Z-th logical sub-sub-storage area included in the Y-th logical sub-storage area included in the X-th logical storage area as the target storage area.

9. The method of claim 1, wherein the spatial sensor comprises at least one of a gyroscope sensor, an acceleration sensor and an altitude sensor.

10. The method of claim 1, further comprising:
    in response to a warning signal being received from the spatial sensor, performing a data protection operation.

11. The method of claim 10, wherein, in response to the spatial information being included in a predetermined reference range, the spatial sensor is configured to generate the warning signal.

12. The method of claim 11, wherein:
    the spatial sensor comprises an altitude sensor, and
    in response to a current altitude measured by the altitude sensor being higher than a reference altitude, the spatial sensor is configured to generate the warning signal.

13. The method of claim 1, further comprising:
    estimating time information from a plurality of data that are included in the target storage area and include the target data.

14. A method of reading data from a storage device, the method comprising:
    receiving spatial information and a data read request from a host device;
    selecting a target storage area and a physical storage area based on the spatial information and the data read request,
    wherein a target data to be read and corresponding to the data read request is stored in the target storage area corresponding to the spatial information among a plurality of logical storage areas,
    wherein the spatial information is not stored in the target storage area with the target data,
    wherein the physical storage area is disposed in a nonvolatile memory corresponding to the target storage area; and
    transmitting a read command to the nonvolatile memory such that the target data is retrieved from the physical storage area corresponding to the target storage area.

15. The method of claim 14, wherein selecting the target storage area and the physical storage area comprises:
selecting the target storage area from among the plurality of logical storage areas based on the spatial information and a spatial information-to-storage location mapping table; and
selecting the physical storage area corresponding to the target storage area based on a logical storage area management table and a logical-to-physical address mapping table.

16. The method of claim 14, further comprising:
receiving the target data from the nonvolatile memory; and
transmitting the target data to the host device.

17. The method of claim 14, further comprising:
in response to a warning signal being received from a spatial sensor included in the storage device, performing a data protection operation.

18. The method of claim 14, further comprising:
estimating time information from a plurality of data that are included in the target storage area and include the target data.

19. A method of operating a storage device, the method comprising:
performing a data write operation based on first spatial information received from a spatial sensor included in the storage device; and
performing a data read operation based on second spatial information received from a host device,
wherein performing the data write operation comprises:
receiving a data write request from the host device;
receiving the first spatial information from the spatial sensor based on the data write request;
updating a logical storage area management table based on the data write request and the first spatial information such that a first target data to be stored is written into a first target storage area corresponding to the first spatial information among a plurality of logical storage areas; and
transmitting a program command and the first target data to a nonvolatile memory such that the first target data is programmed into a first physical storage area in the nonvolatile memory corresponding to the first target storage area,
wherein performing the data read operation comprises:
receiving the second spatial information and a data read request from the host device;
selecting a second target storage area and a second physical storage area based on the second spatial information and the data read request,
wherein a second target data to be read and corresponding to the data read request is stored in the second target storage area corresponding to the second spatial information among the plurality of logical storage areas, and the second physical storage area in the nonvolatile memory corresponds to the second target storage area;
transmitting a read command to the nonvolatile memory such that the second target data is retrieved from the second physical storage area corresponding to the second target storage area;
receiving the second target data from the nonvolatile memory; and
transmitting the second target data to the host device,
wherein the plurality of logical storage areas comprise first to N-th logical storage areas, where N is a natural number greater than or equal to two,
wherein each of the first to N-th logical storage areas comprises first to M-th logical sub-storage areas, where M is a natural number greater than or equal to two, and
wherein an X-th logical storage area corresponding to the first spatial information is selected from among the first to N-th logical storage areas, where X is a natural number greater than or equal to one and less than or equal to N, a Y-th logical sub-storage area corresponding to the first spatial information is selected from among the first to M-th logical sub-storage areas included in the X-th logical storage area, where Y is a natural number greater than or equal to one and less than or equal to M, and the Y-th logical sub-storage area included in the X-th logical storage area is set as the target storage area.

* * * * *